US012791529B2

(12) United States Patent
Winneg et al.

(10) Patent No.: US 12,791,529 B2
(45) Date of Patent: Nov. 10, 2026

(54) RESONANCE INSPECTION SYSTEM AND METHOD FOR USING SAME

(71) Applicant: RTX Corporation, Farmington, CT (US)

(72) Inventors: Nathan I. Winneg, Somerville, MA (US); Timothy M. Quinn, Gloucester, MA (US); Alan R. Curtis, Acton, MA (US); Ronald B. Coleman, Arlington, MA (US); Cedric E. Harvey, Cambridge, MA (US)

(73) Assignee: RTX Corporation, Farmington, CT (US)

( * ) Notice: Subject to any disclaimer, the term of this patent is extended or adjusted under 35 U.S.C. 154(b) by 357 days.

(21) Appl. No.: 18/658,870

(22) Filed: May 8, 2024

(65) Prior Publication Data

US 2025/0347657 A1 Nov. 13, 2025

(51) Int. Cl.
*G01N 29/24* (2006.01)
*G01N 29/04* (2006.01)
(Continued)

(52) U.S. Cl.
CPC ....... *G01N 29/2437* (2013.01); *G01N 29/223* (2013.01); *G01N 2291/0289* (2013.01);
(Continued)

(58) Field of Classification Search
CPC ............. G01N 29/2437; G01N 29/223; G01N 2291/0289; G01N 2291/2693;
(Continued)

(56) References Cited

U.S. PATENT DOCUMENTS 6,036,636 A 3/2000 Motoki
8,844,399 B2 9/2014 Bousquet
(Continued)

FOREIGN PATENT DOCUMENTS

JP H08154936 A 6/1996

OTHER PUBLICATIONS

EP Search Report for EP Patent Application No. 25175188.9 dated Sep. 15, 2025.

*Primary Examiner* — Laura Martin Sweeney
*Assistant Examiner* — Anthony W Megna Fuentes
(74) *Attorney, Agent, or Firm* — Getz Balich LLC

(57) ABSTRACT

A probe assembly for a resonance inspection system includes an outer guide tube and a probe. The outer guide tube extends along a longitudinal axis between and to a distal outer tube end and a proximate outer tube end. The probe is axially translatable relative to the outer guide tube along the longitudinal axis. The probe includes a probe housing, at least one piezoelectric transducer, a flexible cable assembly, and at least one shape-memory alloy (SMA) rod. The probe is selectively positionable in a retracted condition and a deployed condition. In the retracted condition, the probe has a first axial probe position and the remembered angular bend is constrained within the outer guide tube. In the deployed condition, the probe has a second axial probe position and the probe axis is oriented at a predetermined angle relative to the longitudinal axis by the remembered angular bend.

20 Claims, 10 Drawing Sheets

(51) Int. Cl.
*G01N 29/22* (2006.01)
*G01N 29/265* (2006.01)

(52) U.S. Cl.
CPC ................ *G01N 2291/2693* (2013.01); *G01N 2291/2694* (2013.01)

(58) Field of Classification Search
CPC ........... G01N 2291/2694; G01N 29/24; G01N 29/265; G01N 29/043
See application file for complete search history.

(56) References Cited

U.S. PATENT DOCUMENTS

| | | | | |
|---|---|---|---|---|
| 11,480,068 | B2 | 10/2022 | Trivedi | |
| 11,813,745 | B2 | 11/2023 | Lepage | |
| 2014/0182373 | A1 | 7/2014 | Sbihli | |
| 2018/0238834 | A1 | 8/2018 | Sekiguchi | |
| 2021/0083559 | A1 * | 3/2021 | Oya | G01N 29/07 |
| 2023/0085301 | A1 * | 3/2023 | Trivedi | B23P 6/002 29/889.1 |

* cited by examiner

RESONANCE INSPECTION SYSTEM AND METHOD FOR USING SAME

BACKGROUND

1. Technical Field

This disclosure relates generally to the inspection of aircraft propulsion system components using non-destructive testing techniques and, more particularly, to resonance-based component inspection.

2. Background Information

Various systems and methods are known in the art for inspecting a component for internal defects. While these known inspection systems and methods have various benefits, there is still room in the art for improvement.

SUMMARY

It should be understood that any or all of the features or embodiments described herein can be used or combined in any combination with each and every other feature or embodiment described herein unless expressly noted otherwise.

According to an aspect of the present disclosure, a probe assembly for a resonance inspection system includes an outer guide tube and a probe. The outer guide tube extends along a longitudinal axis between and to a distal outer tube end and a proximate outer tube end. The probe is at least partially disposed within the outer guide tube. The probe is axially translatable relative to the outer guide tube along the longitudinal axis. The probe includes a probe housing, at least one piezoelectric transducer, a flexible cable assembly, and at least one shape-memory alloy (SMA) rod. The probe housing extends along a probe axis of the probe between and to a distal housing end and a proximate housing end. The at least one piezoelectric transducer is disposed within the probe housing at the distal end. The flexible cable assembly is connected to the probe housing at the proximate housing end. The at least one SMA rod is disposed at the proximate housing end and positioned within the probe housing and the flexible cable assembly. The at least one SMA rod is configured with a remembered angular bend disposed within the flexible cable assembly. The probe is selectively positionable in a retracted condition and a deployed condition relative to the outer guide tube. In the retracted condition, the probe has a first axial probe position relative to the longitudinal axis, the probe axis is aligned with the longitudinal axis, and the remembered angular bend is constrained within the outer guide tube. In the deployed condition, the probe has a second axial probe position relative to the longitudinal axis and the probe axis is oriented at a predetermined angle relative to the longitudinal axis by the remembered angular bend.

In any of the aspects or embodiments described above and herein, the at least one piezoelectric transducer may include a sense piezo and a drive piezo.

In any of the aspects or embodiments described above and herein, the sense piezo and the drive piezo may form a double-stacked piezo configuration of the at least one piezoelectric transducer with the sense piezo and the drive piezo disposed on the probe axis.

In any of the aspects or embodiments described above and herein, the sense piezo may be disposed at the distal housing end and the drive piezo may be disposed axially between the sense piezo and the proximate housing end relative to the probe axis.

In any of the aspects or embodiments described above and herein, the probe may further include a tip member disposed at the distal housing end and outside of the probe housing. The tip member may include a tip member material. The tip member material may be alumina.

In any of the aspects or embodiments described above and herein, the tip member may include a contact surface. The contact surface may have a spherical dome shape centered about the probe axis.

In any of the aspects or embodiments described above and herein, the probe may further include a separator member disposed axially, relative to the probe axis, between and contacting the sense piezo and the drive piezo. The separator member may include a separator member material. The separator member material may be alumina.

In any of the aspects or embodiments described above and herein, the probe may further include a tail mass and a vibration isolator. The tail mass may be disposed at and contacting the at least one piezoelectric transducer. The vibration isolator may be disposed axially, relative to the probe axis, between and contacting the tail mass and the at least one SMA rod.

In any of the aspects or embodiments described above and herein, the probe assembly may further include an inner tube disposed within the outer guide tube. The inner tube may be axially translatable along the longitudinal axis within the outer guide tube. The inner tube may extend along the longitudinal axis between and to a distal inner tube end and a proximate inner tube end. The inner tube may surround a portion of the flexible cable assembly. The inner tube may be fixedly attached to the flexible cable assembly at the distal inner tube end.

In any of the aspects or embodiments described above and herein, the probe assembly may further include a pre-load device coupled to the inner tube. The pre-load device may be configured to selectively axially bias the inner tube, relative to the longitudinal axis, in an axial direction toward the distal inner tube end.

In any of the aspects or embodiments described above and herein, the probe assembly may further include a wedge member. The wedge member may include a rod and a wedge body. The rod may be disposed within the outer guide tube and radially between the outer guide tube and the inner tube relative to the longitudinal axis. The rod may be axially translatable along the longitudinal axis within the outer guide tube. The rod may extend along the longitudinal axis between and to a distal rod end and a proximate rod end. The wedge body may be disposed at the distal rod end. The wedge body may be axially translatable with the rod between and to a first axial wedge position and a second axial wedge position. In the first axial wedge position the wedge body may be axially separated from the probe and in the second axial wedge position the wedge body may contact the probe.

In any of the aspects or embodiments described above and herein, the outer guide tube may include an enclosed tube portion and an open tube portion. The enclosed tube portion may extend between and to the proximate outer tube end and the open tube portion. The open tube portion may extend between and to the enclosed tube portion and the distal outer tube end. The probe housing may be disposed at the open tube portion in the retracted condition of the probe.

In any of the aspects or embodiments described above and herein, the outer guide tube may further include a wear strip disposed at an interface between the enclosed tube portion and the open tube portion.

According to another aspect of the present disclosure, a method for positioning a probe assembly for a resonance inspection system on an interior component of an aircraft propulsion system includes inserting the probe assembly into the aircraft propulsion system to position a probe of the probe assembly at the interior component with the probe in a retracted condition of the probe. The probe includes a probe housing, at least one piezoelectric transducer, and at least one shape-memory alloy (SMA) rod. The probe housing extends along a probe axis of the probe between and to a distal housing end and a proximate housing end. The at least one piezoelectric transducer is disposed within the probe housing at the distal end. The at least one SMA rod is configured with a remembered angular bend. The probe assembly further includes an outer guide tube extending along a longitudinal axis between and to a distal outer tube end and a proximate outer tube end, and, in the retracted condition of the probe, the probe axis is aligned with the longitudinal axis and at least a portion of the probe is disposed within the outer guide tube with the outer guide tube constraining the remembered angular bend. The method further includes positioning the probe on the interior component by positioning the probe from the retracted condition to a deployed condition of the probe by axially translating the probe, relative to the longitudinal axis, from a first axial probe position to a second axial probe position. In the second axial probe position the probe axis is oriented at a predetermined angle relative to the longitudinal axis by the remembered angular bend and the probe is positioned on the interior component.

In any of the aspects or embodiments described above and herein, the method may further include axially translating a wedge member of the probe assembly, relative to the longitudinal axis, to contact the probe with the probe in the deployed condition.

In any of the aspects or embodiments described above and herein, the steps of inserting the probe assembly into the aircraft propulsion system and positioning the probe on the interior component may be performed with the aircraft propulsion system installed on an aircraft.

In any of the aspects or embodiments described above and herein, the interior component may be a gas turbine engine rotor disk of the aircraft propulsion system.

According to another aspect of the present disclosure, a probe assembly for a resonance inspection system includes an outer guide tube, an inner tube, and a probe. The outer guide tube extends along a longitudinal axis between and to a distal outer tube end and a proximate outer tube end. The inner tube is disposed within the outer guide tube. The inner tube is axially translatable along the longitudinal axis within the outer guide tube. The inner tube extends along the longitudinal axis between and to a distal inner tube end and a proximate inner tube end. The probe is at least partially disposed within the outer guide tube. The probe is axially translatable relative to the outer guide tube along the longitudinal axis. The probe includes a probe housing, at least one piezoelectric transducer, a flexible cable assembly, and at least one shape-memory alloy (SMA) rod. The probe housing extends along a probe axis of the probe between and to a distal housing end and a proximate housing end. The at least one piezoelectric transducer is disposed within the probe housing at the distal end. The flexible cable assembly is connected to the probe housing at the proximate housing end. The flexible cable assembly extends through the inner tube. The flexible cable assembly is fixedly attached to the inner tube at the distal inner tube end. The at least one SMA rod is disposed at the proximate housing end and positioned within the probe housing and the flexible cable assembly. The at least one SMA rod is configured with a remembered angular bend. The remembered angular bend is disposed within the flexible cable assembly between the proximate housing end and the distal inner tube end.

In any of the aspects or embodiments described above and herein, the at least one piezoelectric transducer may include a sense piezo and a drive piezo.

In any of the aspects or embodiments described above and herein, the sense piezo and the drive piezo may form a double-stacked piezo configuration of the at least one piezoelectric transducer with the sense piezo and the drive piezo disposed on the probe axis.

The present disclosure, and all its aspects, embodiments and advantages associated therewith will become more readily apparent in view of the detailed description provided below, including the accompanying drawings.

DETAILED DESCRIPTION

Figure 1:
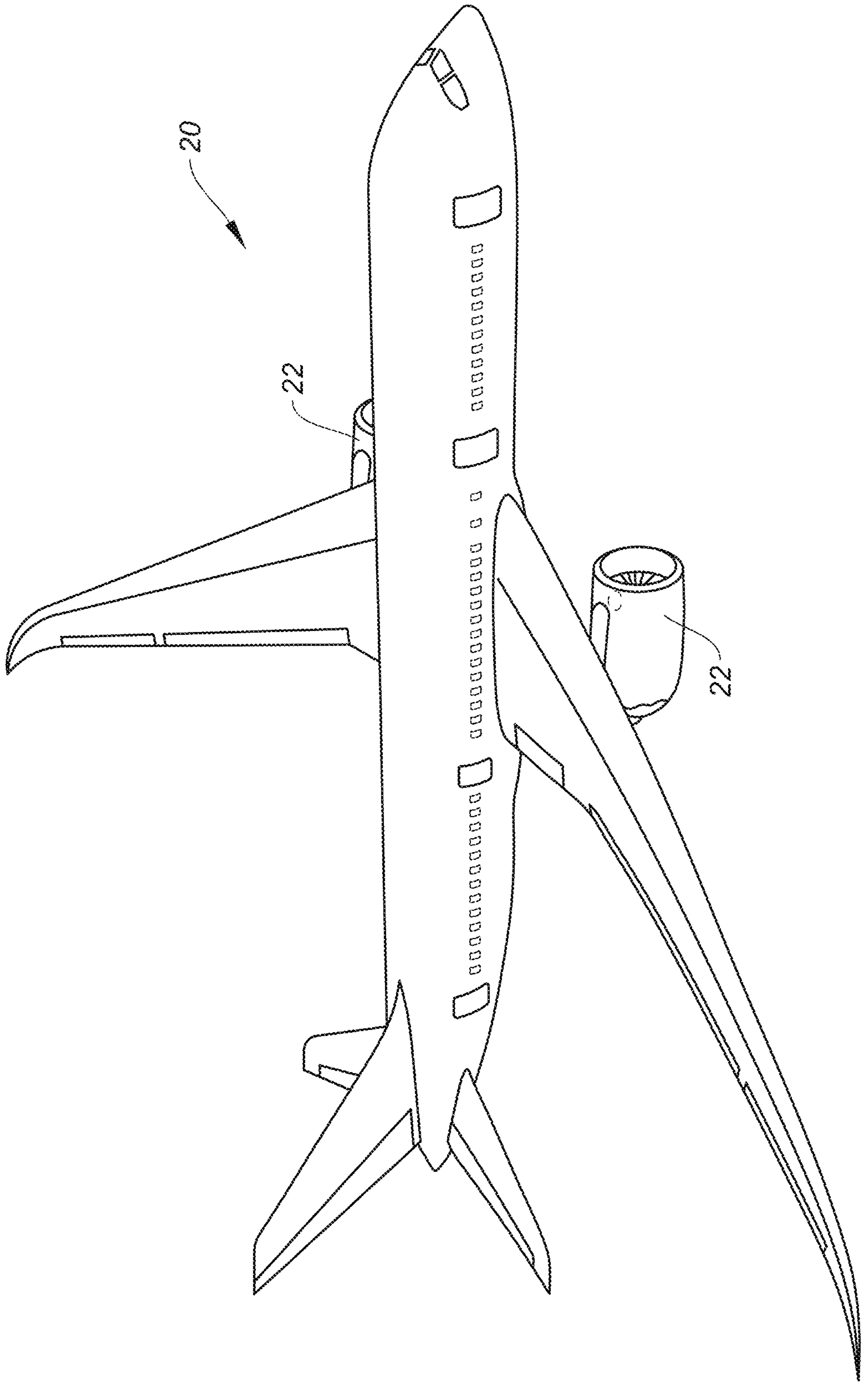
FIG. 1 illustrates a perspective view of an aircraft including a propulsion system, in accordance with one or more embodiments of the present disclosure.
Figure 2:
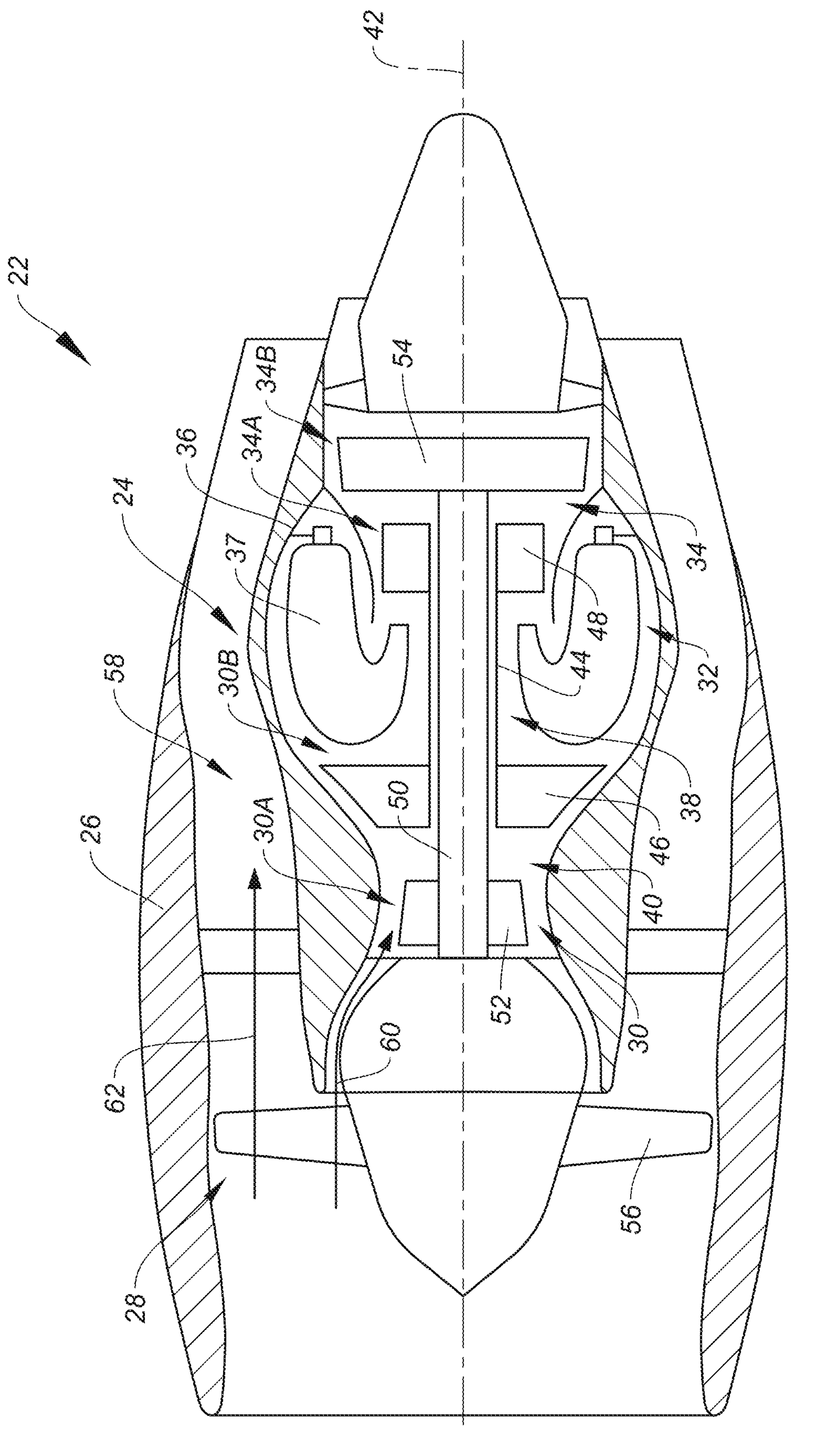
FIG. 2 schematically illustrates a cutaway, side view of an aircraft propulsion system including a gas turbine engine, in accordance with one or more embodiments of the present disclosure.

FIG. 1 illustrates an aircraft 20 including a propulsion system 22. Briefly, the aircraft 20 may be a fixed-wing aircraft (e.g., an airplane), a rotary-wing aircraft (e.g., a helicopter), a tilt-rotor aircraft, a tilt-wing aircraft, or another aerial vehicle. Moreover, the aircraft 20 may be a manned aerial vehicle or an unmanned aerial vehicle (UAV, e.g., a drone). FIG. 2 schematically illustrates a cutaway, side view of the propulsion system 22. The propulsion system 22 of FIG. 2 includes a gas turbine engine 24 and a nacelle 26.

The gas turbine engine 24 of FIG. 2 is configured as a multi-spool turbofan gas turbine engine 24. However, while the following description and accompanying drawings may refer to the turbofan gas turbine engine 24 of FIG. 2 as an example, it should be understood that aspects of the present disclosure may be equally applicable to other types of gas turbine engines including, but not limited to, a turboshaft gas turbine engine, a turboprop gas turbine engine, a turbojet gas turbine engine, a propfan gas turbine engine, or an open rotor gas turbine engine.

The gas turbine engine 24 of FIG. 2 includes a fan section 28, a compressor section 30, a combustor section 32, a turbine section 34, and an engine static structure 36. The compressor section 30 includes a low-pressure compressor (LPC) 30A and a high-pressure compressor (HPC) 30B. The combustor section 32 includes a combustor 37 (e.g., an annular combustor). The turbine section 34 includes a high-pressure turbine (HPT) 34A and a low-pressure turbine (LPT) 34B.

Components of the fan section 28, the compressor section 30, and the turbine section 34 form a first rotational assembly 38 (e.g., a high-pressure spool) and a second rotational assembly 40 (e.g., a low-pressure spool) of the gas turbine engine 24. The first rotational assembly 38 and the second rotational assembly 40 are mounted for rotation about a rotational axis 42 (e.g., an axial centerline) of the gas turbine engine 24 relative to the engine static structure 36.

The first rotational assembly 38 includes a first shaft 44, a bladed first compressor rotor 46 for the high-pressure compressor 30B, and a bladed first turbine rotor 48 for the high-pressure turbine 34A. The first shaft 44 interconnects the bladed first compressor rotor 46 and the bladed first turbine rotor 48.

The second rotational assembly 40 includes a second shaft 50, a bladed second compressor rotor 52 for the low-pressure compressor 30A, a bladed second turbine rotor 54 for the low-pressure turbine 34B, and a bladed fan rotor 56 for the fan section 28. The second shaft 50 interconnects the bladed second compressor rotor 52 and the bladed second turbine rotor 54. The second shaft 50 may additionally interconnect the bladed fan rotor 56 with the bladed second compressor rotor 52 and the bladed second turbine rotor 54. Alternatively, the second shaft 50 may be coupled with the bladed fan rotor 56 by a gear assembly (e.g., a reduction gear box (RGB)). The first shaft 44 and the second shaft 50 are concentric and configured to rotate about the rotational axis 42. The present disclosure, however, is not limited to concentric configurations of the first shaft 44 and the second shaft 50.

The engine static structure 36 may include one or more engine cases, cowlings, bearing assemblies, inner fixed structures, and/or other non-rotating structures configured to house and/or support (e.g., rotationally support) components of the gas turbine engine sections 28, 30, 32, 34. The engine static structure 36 may form an exterior (e.g., an outer radial portion) of the gas turbine engine 24.

The nacelle is configured to house and provide an aerodynamic cover for the gas turbine engine 24. The nacelle may extend circumferentially about (e.g., completely around) the gas turbine engine 24 and its rotational axis 42. The nacelle may circumscribe and form an annular bypass duct 58 through the propulsion system 22. For example, the bypass duct 58 may be formed by and between (e.g., radially between) the gas turbine engine 24 (e.g., the engine static structure 36) and the nacelle.

In operation of the gas turbine engine 24, ambient air is directed through the fan section 28 and into a core flow path 60 (e.g., an annular flow path) and a bypass flow path 62 (e.g., an annular flow path) by rotation of the bladed fan rotor 56. Air flow along the core flow path 60 is compressed by the low-pressure compressor 30A and the high-pressure compressor 30B, mixed and burned with fuel in the combustor, and then directed through the high-pressure turbine 34A and the low-pressure turbine 34B. The bladed first turbine rotor 48 and the bladed second turbine rotor 54 rotationally drive the first rotational assembly 38 and the second rotational assembly 40, respectively, in response to the combustion gas flow through the high-pressure turbine 34A and the low-pressure turbine 34B. Air flow along the bypass flow path 62 is directed through the bypass duct 58.

Figure 3:
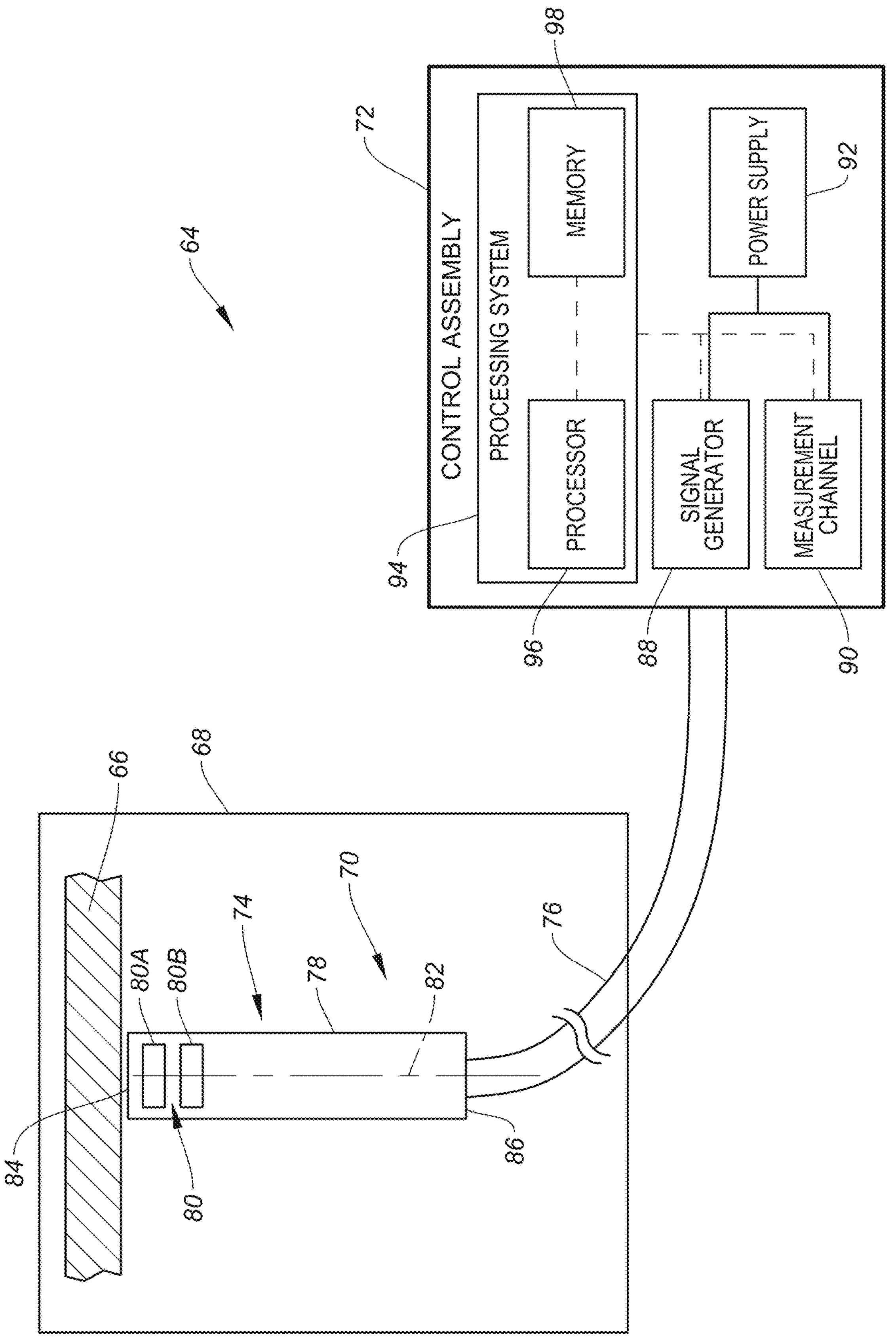
FIG. 3 schematically illustrates an inspection system for an aircraft propulsion system, in accordance with one or more embodiments of the present disclosure.

FIG. 3 schematically illustrates an inspection system 64 for inspecting a component 66 of an aircraft propulsion system 68 such as, but not limited to, the propulsion system 22 of FIGS. 1 and 2. The inspection system 64 may be configured to facilitate inspection of the component 66 while the component 66 remains installed with the propulsion system 68 on the aircraft 20 (e.g., the propulsion system 68 remains installed on wing, on fuselage, in airframe, etc.). The component 66, for example, may be disposed within an interior (e.g., an enclosed volume, an encased volume, etc.) of the propulsion system 68. Inspection of the component 66 may also be performed using the inspection system 64 while outside of an aircraft hangar and/or a dedicated inspection and/or repair facility (e.g., on a tarmac at an airport between aircraft flights). Inspection of the component 66 may thereby be performed with a relatively short aircraft downtime and/or a relatively minimal expense. The inspection system 64, of course, may also be used for inspecting the component 66 installed with the propulsion system 68 when that propulsion system 68 is not installed with the aircraft 20 (e.g., prior to installation with the aircraft 20 or following removal from the aircraft 20) or with the component 66 removed from the propulsion system 68. Inspection of the component 66 using the inspection system 64 may facilitate identification of one or more internal defects of the component such as cracks, voids, etc. (e.g., embedded within material of) the component 66. The term "defect," as used herein, shall refer to a physical anomaly present within a component (e.g., the component 66) which negatively affects the useful life or performance of the component.

The component 66 may be any inspectable (e.g., metal) component 66 within the propulsion system 68. However, for ease of description, the component 66 may be described below as a rotor disk of a bladed rotor of a gas turbine engine such as, but not limited to, the gas turbine engine 24 of FIG. 2. The rotor disk may be a turbine disk such as a rotor disk in a high-pressure turbine (HPT) or a low-pressure turbine (LPT) of a gas turbine engine. Alternatively, the rotor disk may be a compressor disk such as a rotor disk in a low-pressure compressor (LPC) or a high-pressure compressor (HPC) of a gas turbine engine. The present disclosure, however, is not limited to such exemplary component 66 configurations. The component 66, for example, may alternatively be configured as a hub, a shaft or any rotating component within the propulsion system 68.

The inspection system 64 of FIG. 3 is configured as an ultrasonic testing (UT) system. For example, the inspection system 64 may be configured for ultrasonic testing, process compensated resonance testing (PCRT), and/or other non-destructive testing (NDT) techniques involving application of ultrasonic vibration to a test object (e.g., the component 66). The inspection system 64 of FIG. 3 includes a probe assembly 70 and a control assembly 72.

The probe assembly 70 may be a borescope probe assembly configured for insertion into the propulsion system 68 for inspection of the component 66. However, the probe assembly 70 of the present disclosure is not limited to borescope probe assembly configurations. The probe assembly 70 of FIG. 3, for example, includes a probe 74 and a guide tube 76.

The probe 74 includes a probe housing 78 and one or more piezoelectric transducers 80. The probe housing 78 extends along a longitudinal axis 82 of the probe 74 between and to a distal end 84 of the probe housing 78 and a proximate end 86 of the probe housing 78. The piezoelectric transducers 80 of FIG. 3 are disposed within the probe housing 78 at (e.g., on, adjacent, or proximate) the distal end 84. The piezoelectric transducers 80 of FIG. 3 include a sense piezoelectric transducer 80A (a "sense piezo") and a drive piezoelectric transducer 80B (a "drive piezo"). The sense piezo 80A and the drive piezo 80B are disposed on the longitudinal axis 82 in an axially stacked (e.g., double-stacked) piezo configuration. For example, the sense piezo 80A is disposed at (e.g., on, adjacent, or proximate) the distal end 84 and the drive piezo 80B is disposed at (e.g., on, adjacent, or proximate) the sense piezo 80A and axially between the sense piezo 80A and the proximate end 86. The present disclosure, however, is not limited to the foregoing exemplary configurations of the piezoelectric transducers 80. For example, the sense piezo 80A and the drive piezo 80B may alternatively be axially coincident relative to the longitudinal axis 82 in a single-stack piezo configuration. The guide tube 76 is connected to the probe 74 at (e.g., on, adjacent, or proximate) the proximate end 86. The guide tube 76 may extend all or a substantial portion of a distance from the probe 74 to the control assembly 72. The guide tube 76 may be configured as a conduit to housing and protect wiring extending between the probe 74 and the control assembly 72. The guide tube 76 may be a flexible body. For example, the guide tube 76 may include one or more internal actuators for manipulating a configuration of the guide tube 76 to aid in maneuvering the probe 74 and the guide tube 76 within the propulsion system 68 to the component 66.

The control assembly 72 of FIG. 3 includes a signal generator 88, a measurement channel 90, a power supply 92, and a processing system 94. The signal generator 88 and the measurement channel 90 are electrically connected with the power supply 92. The power supply 92 may be, for example, as a direct current (DC) power supply 92 configured to supply DC power to the signal generator 88 and the measurement channel 90 to effect the operation thereof.

Figure 4:
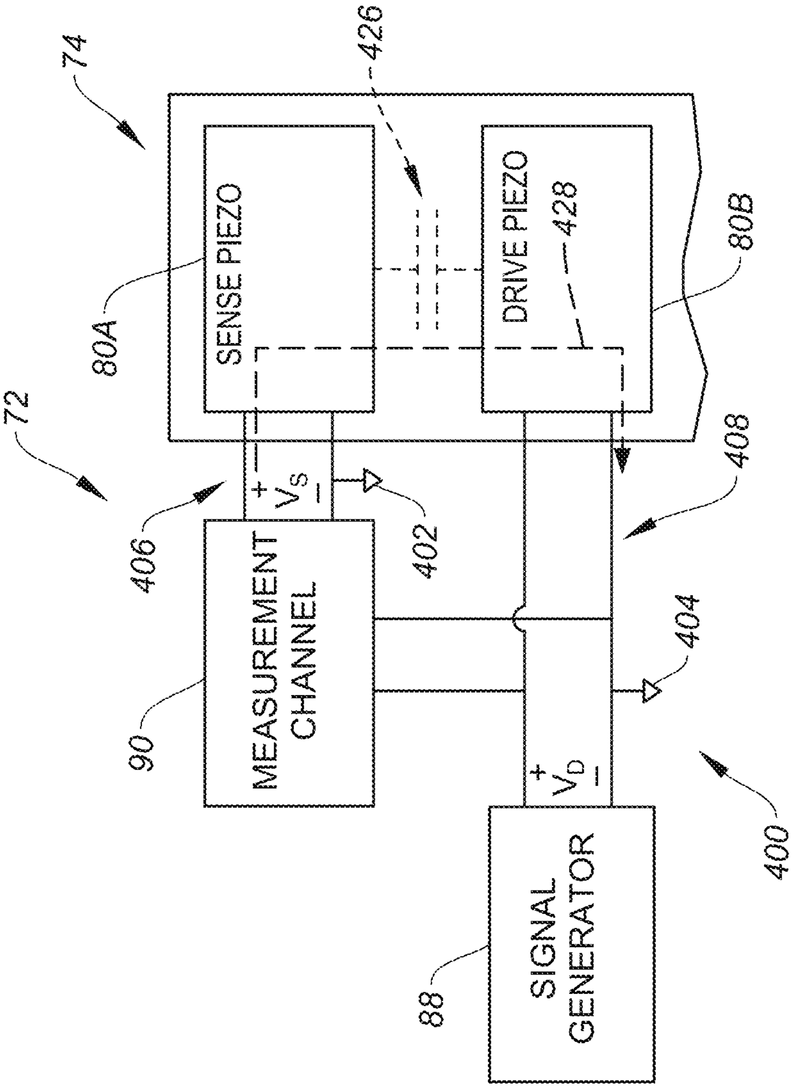
FIG. 4 schematically illustrates a portion of a control assembly for the inspection system of FIG. 3, in accordance with one or more embodiments of the present disclosure.

FIG. 4 schematically illustrates portions of the probe assembly 70 and the control assembly 72 in greater detail. The signal generator 88 is electrically connected to the drive piezo. The signal generator 88 is configured to generate a high-frequency alternating current (AC) signal (e.g., a sinusoidal driving voltage signal $V_D$) and apply the AC signal to the drive transducer to control the drive piezo 80B to generate ultrasonic vibration for application to the component 66. The measurement channel 90 is electrically connected to the sense piezo 80A. The measurement channel 90 is configured to measure a vibratory response of the sense piezo 80A. In particular, the measurement channel 90 is configured to receive a high-frequency AC signal (e.g., a sinusoidal sense voltage signal Vs) generated by the sense piezo 80A. The measurement channel 90 may additionally be electrically connected to the signal generator 88 to receive the driving voltage signal $V_D$. The measurement channel 90 may be configured to convert an analog driving voltage signal $V_D$ and/or an analog sense voltage signal Vs to a digital signal for analysis by the processing system 94.

Figure 5:
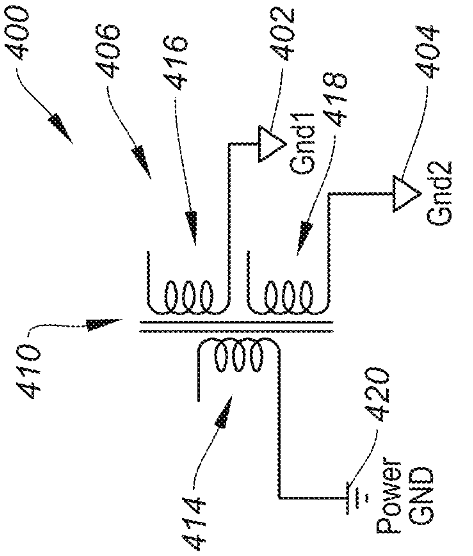
FIG. 5 schematically illustrates a portion of a grounding subassembly for the control assembly of FIG. 4, in accordance with one or more embodiments of the present disclosure.
Figure 6:
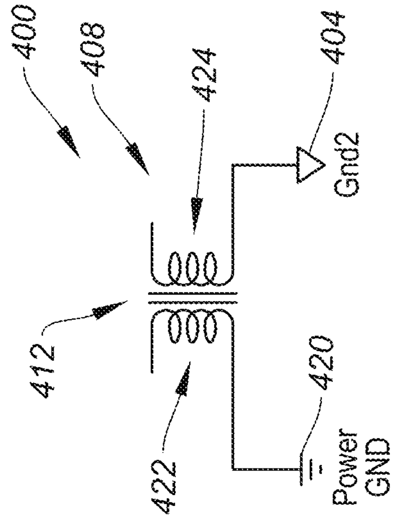
FIG. 6 schematically illustrates another portion of the grounding subassembly for the control assembly of FIG. 4, in accordance with one or more embodiments of the present disclosure.

Referring to FIGS. 4-6, the control assembly 72 may further include an electrical grounding subassembly 400. The control assembly 72 of the present disclosure, however, is not limited to use with (e.g., inclusion of) the grounding subassembly 400. The grounding subassembly 400 of FIG. 4 includes a first ground (Gnd1) 402 and a second ground (Gnd2) 404. The first ground 402 is disposed on a sense circuit 406 of the control assembly 72 electrically interconnecting the measurement channel 90 and the sense piezo 80A. The second ground 404 is disposed on a drive circuit 408 of the control assembly 72 electrically interconnecting the signal generator 88 with the drive piezo 80B and the measurement channel 90. The first ground 402 and the second ground 404 are galvanically isolated from one another. In other words, the first ground 402 and the second ground 404 are isolated from one another such that there is no direction electrical current path between the first ground 402 and the second ground 404.

The grounding subassembly 400 of FIGS. 5 and 6 includes a first transformer 410 and a second transformer 412 configured to effect galvanic isolation of the first ground 402 and the second ground 404. FIG. 5 schematically illustrates a portion of the grounding subassembly 400, for the measurement channel 90 (e.g., the sense circuit 406), including the first transformer 410. The first transformer 410 includes a primary coil 414, a first secondary coil 416, and a second secondary coil 418. The primary coil 414 is electrically connected to a power supply ground (Power GND) 420 of the power supply 92. The first secondary coil 416 is electrically connected to the first ground 402. The second secondary coil 418 is electrically connected to the second ground 404. FIG. 6 schematically illustrates a portion of the grounding subassembly 400, for the signal generator 88 (e.g., the drive circuit 408), including the second transformer 412. The second transformer 412 includes a primary coil 422 and a secondary coil 424. The primary coil 422 is electrically connected to the power supply ground 420. The secondary coil 424 is electrically connected to the second ground 404. The present disclosure, however, is not limited to the foregoing exemplary configuration of the grounding sub assembly including the first transformer 410 and the second transformer 412 for galvanically isolating the first ground 402 and the second ground 404. For example, the grounding subassembly 400 may alternatively include capacitors, relays, or other electrical components suitable for galvanically isolating the first ground 402 and the second ground 404.

As schematically illustrated in FIG. 4, in the absence of the present disclosure grounding subassembly 400 (e.g., galvanic isolation of the first ground 402 from the second ground 404), a parasitic capacitance 426 may develop between the sense piezo 80A and the drive piezo 80B during operation of the probe 74. For example, the parasitic capacitance 426 may develop between the sense piezo 80A and the drive piezo 80B in an axially stacked piezo configuration, such as the axially stacked piezo configuration illustrated in FIGS. 3 and 4. The parasitic capacitance 426 may contribute to an electrical coupling between the sense circuit 406 and the drive circuit 408. For example, the parasitic capacitance 426 may form an electrical current flow path 428 from the sense circuit 406, through the sense piezo 80A and the drive piezo, to the drive circuit 408 (e.g., to the second ground 404). This electrical coupling between the sense circuit 406 and the drive circuit 408 may complicate accurate interpretation of the voltages (e.g., the sense voltage signal Vs and the drive voltage signal $V_D$) across the sense piezo 80A and the drive piezo 80B (e.g., as measured by the measurement channel 90 and the processing system 94). Accordingly, the present disclosure grounding subassembly 400 facilitates more accurate measurement of piezo sense and drive voltage signals by preventing or minimizing parasitic capacitance 426 between the sense piezo 80A and the drive piezo.

The processing system 94 may be connected in signal communication with at least some of the components of the control assembly 72 (e.g., the signal generator 88, the measurement channel 90, etc.) to control and/or receive signals therefrom to perform the functions described herein. The processing system 94 includes a processor 96 and memory 98 connected in signal communication with the processor. The processor 96 may include any type of computing device, computational circuit, processor(s), CPU, computer, or the like capable of executing a series of instructions that are stored in memory 98. Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. The instructions may include an operating system, and/or executable software modules such as program files, system data, buffers, drivers, utilities, and the like. The executable instructions may apply to any functionality described herein to enable the inspection system 64 to accomplish the same algorithmically and/or coordination of inspection system 64 components. The memory 98 may include a single memory device or a plurality of memory devices (e.g., a computer-readable storage device that can be read, written, or otherwise accessed by a general purpose or special purpose computing device, including any processing electronics and/or processing circuitry capable of executing instructions). The present disclosure is not limited to any particular type of memory device, which may be non-transitory, and may include read-only memory, random access memory, volatile memory, non-volatile memory, static memory, dynamic memory, flash memory, cache memory, volatile or non-volatile semiconductor memory, optical disk storage, magnetic disk storage, magnetic tape, other magnetic storage devices, or any other medium capable of storing one or more instructions, and/or any device that stores digital information. The memory device(s) may be directly or indirectly coupled to the control assembly 72 and its processing system 94. The processing system 94 may include, or may be in communication with, an input device that enables a user to enter data and/or instructions, and may include, or be in communication with, an output device configured, for example to display information (e.g., a visual display or a printer), or to transfer data, etc. Communications between the processing system 94 and the inspection system 64 and its components may be via a hardwire connection or via a wireless connection. A person of skill in the art will recognize that portions of the processing system 94 may assume various forms (e.g., digital signal processor, analog device, etc.) capable of performing the functions described herein.

Figure 7:
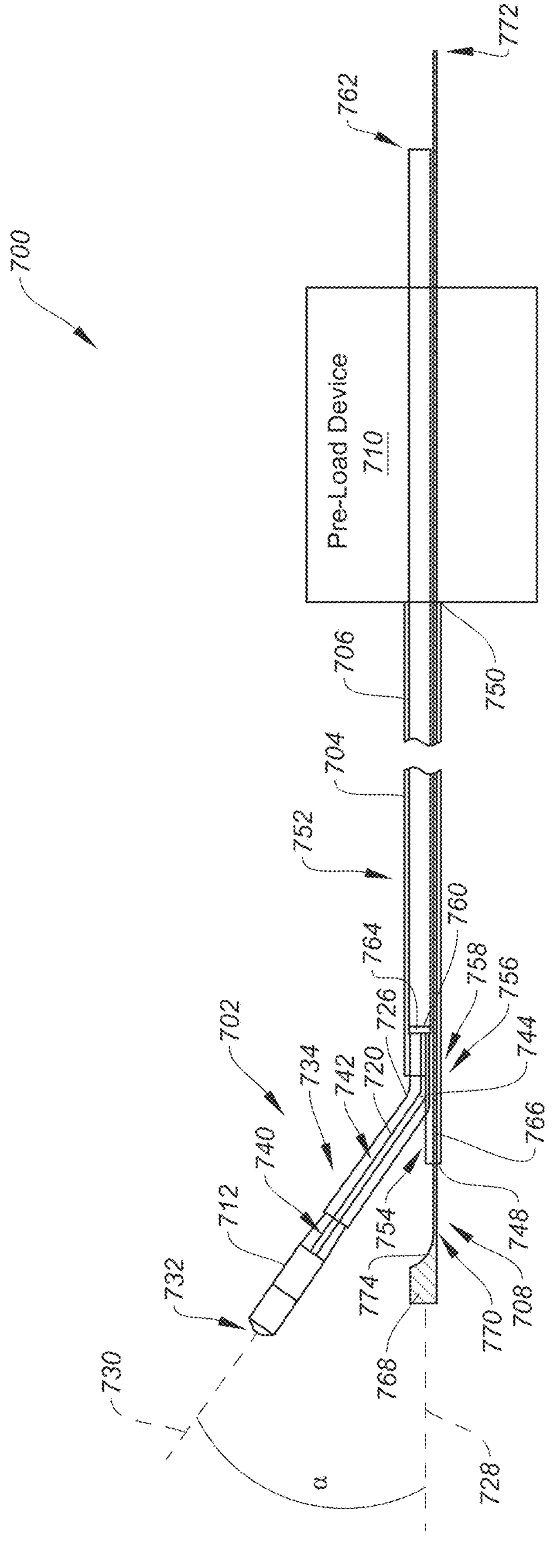
FIG. 7 illustrates a side view of a probe assembly for an inspection system, in accordance with one or more embodiments of the present disclosure.
Figure 8:
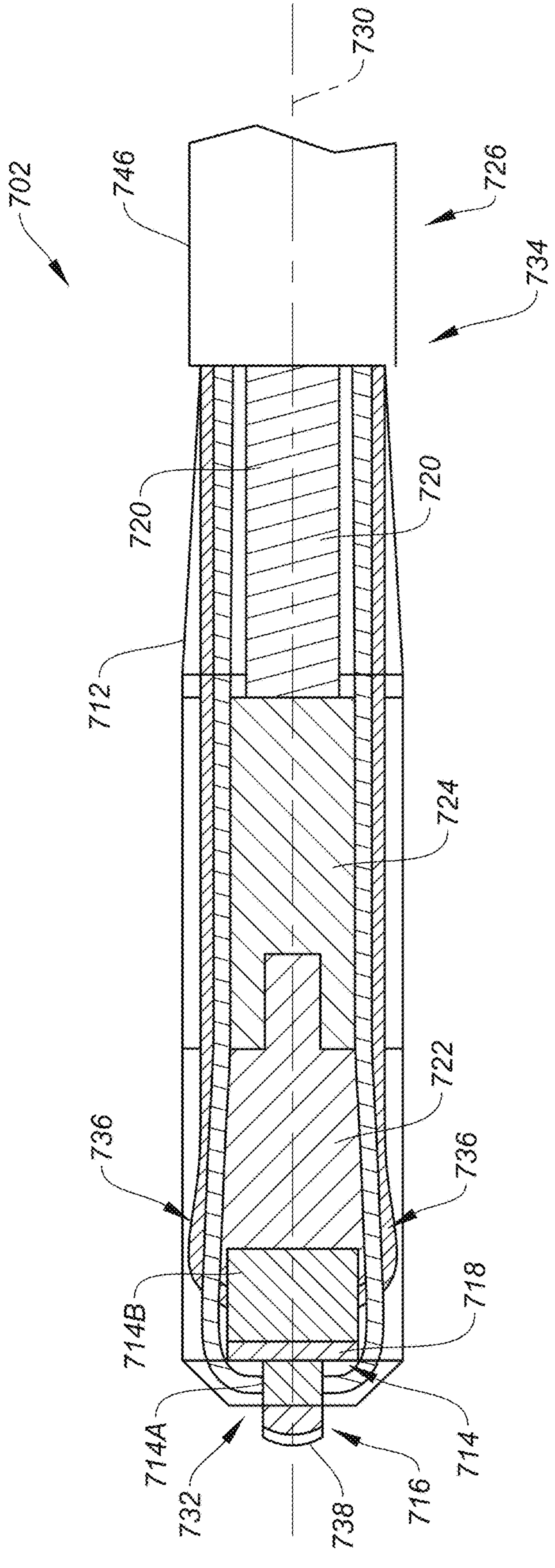
FIG. 8 illustrates a cutaway, side view of a probe for the probe assembly of FIG. 7, in accordance with one or more embodiments of the present disclosure.

FIGS. 7 and 8 illustrate a probe assembly 700. FIG. 7 illustrates a side view of the probe assembly 700. FIG. 8 illustrates a cutaway view of a portion (e.g., a probe) of the probe assembly 700. The probe assembly 700 may be used with the inspection system 64 (see FIG. 3). For example, the probe assembly 70 of FIG. 3 may include or be formed by the probe assembly 700. However, the inspection system 64 is not limited to use with the probe assembly 700. The probe assembly 700 is configured as a borescope probe assembly for insertion into an aircraft propulsion system 68 for inspection of a test component (e.g., the propulsion system 68 and the component 66 of FIG. 3). The probe assembly 700 of FIG. 7 includes a probe 702, an outer guide tube 704, an inner tube 706, and a wedge member 708. The probe assembly 700 may further include a pre-load device 710.

The probe 702 of FIGS. 7 and 8 includes a probe housing 712, one or more piezoelectric transducers 714, a tip member 716, a separator member 718, one or more shape-memory alloy (SMA) rods 720, a tail mass 722, a vibration isolator 724, and a cable assembly 726. The probe 702 and its components are configured for axial translation along a longitudinal axis 728 of the probe assembly 700 (e.g., within the outer guide tube 704).

The probe housing 712 extends along probe axis 730 (e.g., a longitudinal axis or centerline axis) of the probe 702 between and to a distal end 732 of the probe housing 712 and a proximate end 734 of the probe housing 712. The probe housing 712 may extend circumferentially about (e.g., completely around) the probe axis 730 between and to the distal end 732 and the proximate end 734.

The piezoelectric transducers 714 of FIG. 8 are disposed within the probe housing 712 at (e.g., on, adjacent, or proximate) the distal end 732. The piezoelectric transducers 714 of FIG. 8 include a sense piezo 714A and a drive piezo 714B. The sense piezo 714A and the drive piezo 714B are disposed on the probe axis 730 in an axially stacked (e.g., double-stacked) piezo configuration. Each of the sense piezo 714A and the drive piezo 714B may be centered about the probe axis 730. The sense piezo 714A is disposed at (e.g., on, adjacent, or proximate) the distal end 732 and the drive piezo 714B is disposed axially between the sense piezo 714A and the proximate end 734 along the probe axis 730. The sense piezo 714A and the drive piezo 714B are electrical connected with the control assembly 72 (see FIGS. 3 and 4) by wires 736.

The tip member 716 is disposed at (e.g., on, adjacent, or proximate) the distal end 732. For example, the tip member 716 may be connected to or otherwise disposed at (e.g., on, adjacent, or proximate) the sense piezo 714A at the distal end 732. All or a substantial portion of the tip member 716 may be disposed outside of (e.g., axially outside of) the probe housing 712. The tip member 716 forms a contact surface 738 configured for contact with a test component (e.g., the component 66 of FIG. 3). The contact surface 738 may form or be configured to form a single point-of-contact between the probe 702 and the component 66. The contact surface 738 may form a distal end of the probe 702 (e.g., relative to the probe axis 730). The contact surface 738 may have a hemispherical or spherical dome shape (e.g., centered about the probe axis 730), however, the present disclosure is not limited to any particular shape of the contact surface 738. The tip member 716 is formed all or in substantial part by a tip member material. For example, the tip member material may be alumina (aluminum oxide, $Al_2O_3$) or another suitable hard and electrically insulative tip member material.

The separator member 718 is disposed axially between the sense piezo 714A and the drive piezo 714B along the probe axis 730 to facilitate electrical isolation of the sense piezo 714A from the drive piezo 714B. For example, the separator member 718 may extend (e.g., axially extend) between and to the sense piezo 714A and the drive piezo 714B. The separator member 718 may be configured, for example, as a disk-shaped plate. The separator member 718 is formed all or in substantial part by a separator member material. The separator material may be the same as or similar to the tip member material for the tip member 716. For example, the separator member material may be alumina (aluminum oxide, $Al_2O_3$) or another suitable hard and electrically insulative tip member material.

The SMA rods 720 are disposed at (e.g., on, adjacent, or proximate) the proximate end 734. For example, a first longitudinal portion 740 of each of the SMA rods 720 is disposed within the probe 702 (e.g., the probe housing 712) and a second longitudinal portion 742 of each of the SMA rods 720 is disposed within the cable assembly 726. The probe 702 of FIGS. 7 and 8 includes two SMA rods 720, however, the present disclosure is not limited to any particular quantity of the SMA rods 720. The SMA rods 720 are trained to remember a specific angular bend 744. FIG. 7 illustrates the SMA rods 720 in a remembered shape so as to form the angular bend 744 on the second longitudinal portion 742. The SMA rods 720 are configured to position the probe 702 to form a predetermined angle $\alpha$ between the longitudinal axis 728 and the probe axis 730 with the SMA rods 720 in their remembered shape (e.g., forming the angular bend 744), as will be discussed in further detail. The predetermined angle $\alpha$ may typically be between about 10 degrees and about 80 degrees, however, the present disclosure is not limited to any particular value of the predetermined angle $\alpha$. The angular bend 744 is disposed within the cable assembly 726 and outside of the probe housing 712. The SMA rods formed all or in substantial part by a shape-memory alloy material such as, but not limited to, nickel-titanium (NiTi), copper-aluminum-nickel, or another suitable shape-memory alloy material which may be trained to remember and precisely form the angular bend 744, for example, within a suitable temperature range for inspection of the component 66 (see FIG. 3).

The tail mass 722 is disposed at (e.g., on, adjacent, or proximate) the drive piezo 714B, for example, axially between the drive piezo 714B and the proximate end 734 along the probe axis 730. The tail mass may be formed, for example, by a heavy metal or metal alloy such as, but not limited to, steel, brass, tungsten, or the like.

The vibration isolator 724 is disposed between the tail mass 722 and the SMA rods 720 along the probe axis 730. For example, the vibration isolator 724 may interconnect the tail mass 722 and the SMA rods 720 (e.g., the first longitudinal portion 740). The vibration isolator 724 is configured to facilitate vibratory isolation of the piezoelectric transducers 714 from other components of the probe assembly 700 and its probe 702 including, for example, the SMA rods 720 and the pre-load device 710. The vibration isolator 724 may be formed by a suitable low-density and/or resilient vibration damping material such as an elastomeric material.

The cable assembly 726 extends between and to the probe 702 and the control assembly 72. The cable assembly 726 is a flexible assembly including the wires 736 and a cable wrap 746. The cable wrap 746 (e.g., a thermoplastic cable wrap) surrounds and protects the wires 736 along all or at least a portion of the length of the cable assembly 726 from the probe housing 712 (e.g., the proximate end 734) toward the control assembly 72. The cable assembly 726 extends through the inner tube 706.

The outer guide tube 704 is a rigid tubular body extending (e.g., axially extending) along the longitudinal axis 728 between and to a distal end 748 of the outer guide tube 704 and a proximate end 750 of the outer guide tube 704. The distal end 748 is disposed at (e.g., on, adjacent, or proximate) the probe 702. The proximate end 750 is disposed at (e.g., on, adjacent, or proximate) the pre-load device 710. The outer guide tube 704 includes an enclosed tube portion 752 and an open tube portion 754. The enclosed tube portion 752 extends circumferentially about (e.g., completely around) the longitudinal axis 728. The enclosed tube portion 752 extends (e.g., axially extends) between and to the proximate end 750 and the open tube portion 754. The open tube portion 754 extends parti-circumferentially about the longitudinal axis 728. For example, the open tube portion 754 may have a semi-circular or circular segment cross-sectional shape relative to the longitudinal axis 728 (e.g., on a plane perpendicular to the longitudinal axis 728). The open tube portion 754 extends (e.g., axially extends) between and to the enclosed tube portion 752 and the distal end 748. An interface 756 between the enclosed tube portion 752 and the open tube portion 754 may be disposed proximate the distal end 748 such that the enclosed tube portion 752 forms a significantly greater axial length of the outer guide tube 704 than the open tube portion 754.

Portions of the outer guide tube 704 and/or the wedge member 708 may include a wear strip 758 disposed at (e.g., on, adjacent, or proximate) the interface 756. For example, the wear strip 758 may be disposed on an interior surface of the outer guide tube 704 along the enclosed tube portion 752 and the open tube portion 754 at (e.g., on, adjacent, or proximate) the interface 756. The wear strip 758 may include or be formed by a low-friction and wear-resistant material such as, but not limited to, ultra-high-molecular-weight polyethylene (UHMW), polytetrafluoroethylene (PTFE), or the like. The wear strip 758 may protect and facilitate reduced wear of the cable assembly 726 (e.g., the cable wrap 746), particularly at the location of the angular bend 744, as the cable assembly 726 translates within the outer guide tube 704 and pivots relative to the longitudinal axis 728 (e.g., at the angular bend 744).

The inner tube 706 is a rigid tubular body disposed within the outer guide tube 704. The inner tube 706 is configured for translation within and relative to the outer guide tube 704 along the longitudinal axis 728. The inner tube 706 extends (e.g., axially extends) along the longitudinal axis 728 between and to a distal end 760 of the inner tube 706 and a proximate end 762 of the inner tube 706. The distal end 760 is coupled to a portion of the cable assembly 726 axially spaced from the probe 702. For example, the distal end 760 of FIG. 7 is coupled (e.g., fixedly connected) to the cable assembly 726 by an adapter 764 disposed within the outer guide tube 704. The proximate end 762 is disposed outside of (e.g., axially outside of) the outer guide tube 704 at (e.g., on, adjacent, or proximate) the pre-load device 710. The inner tube 706 extends circumferentially about (e.g., completely around) the longitudinal axis 728 and an axial portion of the cable assembly 726.

The wedge member 708 includes a rod 766 (e.g., a pushrod) and a wedge body 768. The rod 766 extends (e.g., axially extends) along the longitudinal axis 728 between and to a distal end 770 of the rod 766 and a proximate end 772 of the rod 766. The distal end 770 is disposed at (e.g., on, adjacent, or proximate) the open tube portion 752. The proximate end 772 is disposed outside of (e.g., axially outside of) the outer guide tube 704 at (e.g., on, adjacent, or proximate) the pre-load device 710. The rod 766 extends through the outer guide tube 704 radially between the inner tube 706 and the outer guide tube 704. Alternatively, the rod 766 may extend into and through the inner tube 706 as shown, for example, in FIG. 10. The wedge body 768 is connected to or otherwise disposed on the distal end 770. The wedge body 768 includes a wedge surface 774 facing toward the probe 702 and its cable assembly 726. The wedge surface 774 may be oriented parallel to or substantially parallel to the probe axis 730 with the probe axis 730 oriented at the predetermined angle α relative to the longitudinal axis 728 (e.g., with the SMA rods 720 forming the angular bend 744), or otherwise generally conforming to a shape of the cable assembly 726 at (e.g., on, adjacent, or proximate) the angular bend 744 (e.g., an outside of the angular bend 744). The wedge body 768 is configured to axially translate (e.g., with the rod 766) along and within the outer guide tube 704 (e.g., the open tube portion 754).

The pre-load device 710 is configured to be mounted to a fixed structure of the propulsion system 68 (see FIG. 3; e.g., a portion of the engine static structure 36 (see FIG. 2)) to securely position the probe assembly 700 relative to the propulsion system 68 and its component 66. The pre-load device 710 may be selectively engageable with the inner tube 706. The pre-load device may be configured to apply a predetermined axial biasing force to the inner tube 706 in an axial direction, relative to the longitudinal axis, toward the distal end 760.

Figure 9B:
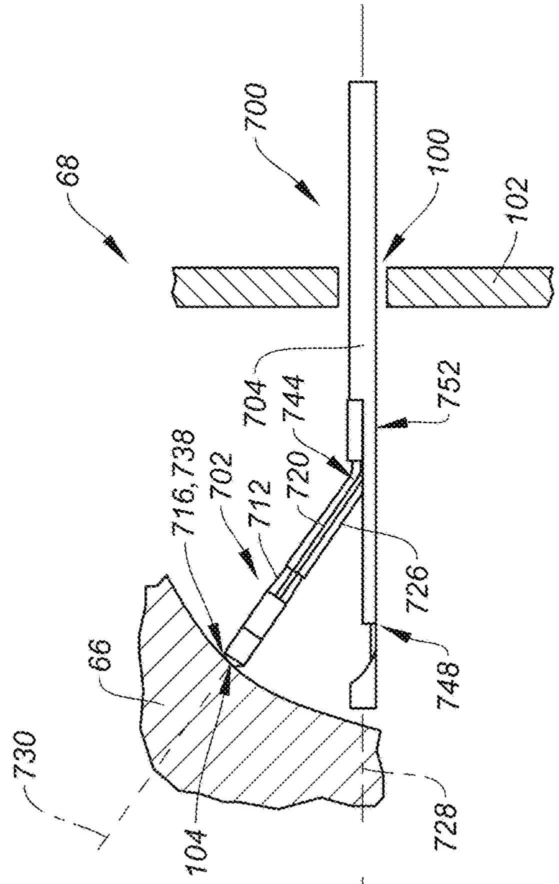
FIGS. 9A-C schematically illustrate a sequence of probe assembly configurations for positioning the probe assembly at a component of an aircraft propulsion system, in accordance with one or more embodiments of the present disclosure.
Figure 9A:
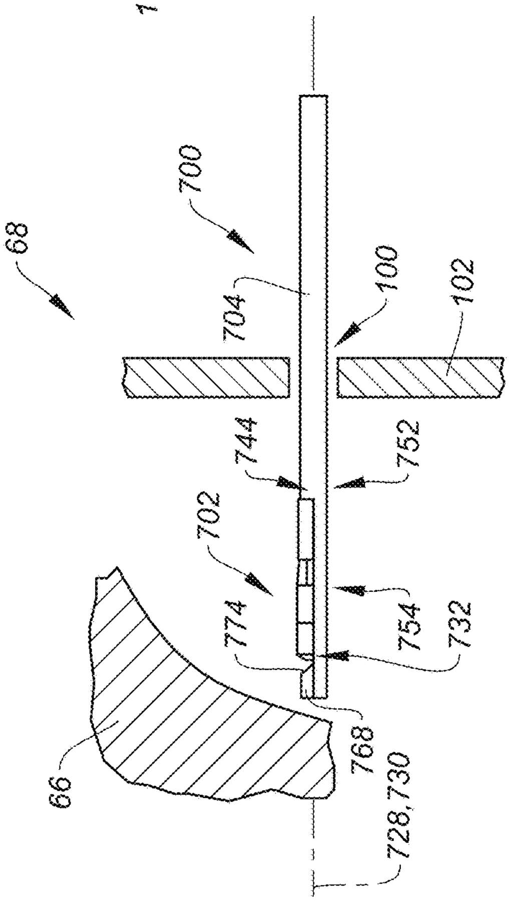
Figure 9C:
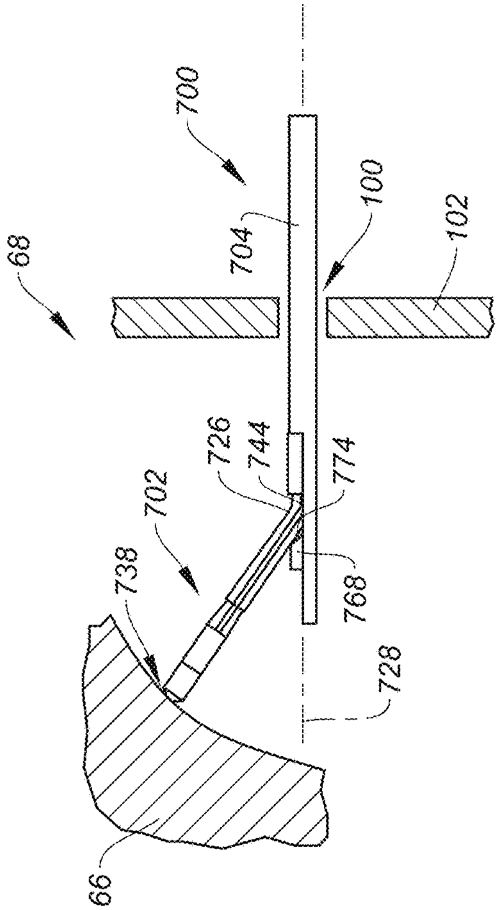

Referring now to FIGS. 3, 7, 8, and 9A-C, the operation of the inspection system 64 will be described in further detail. FIGS. 9A-C schematically illustrate a sequence of probe assembly 700 operations to position the probe 702 at (e.g., on, adjacent, or proximate) the component 66 of the aircraft propulsion system 68. The probe assembly 700 is inserted into the propulsion system 68 by an operator, for example, through one or more borescope ports or other access openings of the propulsion system 68 (e.g., the gas turbine engine 24 of the propulsion system 22; see FIG. 2). As shown in FIGS. 9A-C, portions of the probe assembly 700, including the probe 702, the outer guide tube 704, the inner tube 706 (see FIG. 7), and the wedge member 708, may be inserted together into the propulsion system 68 (e.g., the gas turbine engine 24 of the propulsion system 22) through an opening 100, for example, in an engine case 102 of the engine static structure 36. The probe assembly 700 is positioned at (e.g., on, adjacent, or proximate) the component 66.

As shown in FIG. 9A, the probe assembly 700 is inserted into the propulsion system 68 with the probe 702 in a retracted condition relative to the outer guide tube 704. In this retracted condition, the probe 702 is disposed within the outer guide tube 704 (e.g., within the open tube portion 754 and/or the enclosed tube portion 752). In this condition, the probe axis 730 may be substantially colinear with, parallel to, and/or on or directly adjacent the longitudinal axis 728 (e.g., the probe axis 730 may be aligned with the longitudinal axis 728). The angular bend 744 location of the SMA rods 720 is disposed within the enclosed tube portion 752 such that the enclosed tube portion 752 constrains the angular bend 744 to retain the probe 702 within the outer guide tube 704 with the probe axis 730 aligned with the longitudinal axis 728. The wedge body 768 (e.g., the wedge surface 774) is disposed at (e.g., on, adjacent, or proximate) the distal end 732.

As shown in FIG. 9B, the probe 702 is positioned in a deployed condition relative to the outer guide tube 704. In this deployed condition, the probe 702 is positioned relative to the component 66 with the probe 702 (e.g., the contact surface 738 of the tip member 716) positioned on a predetermined ultrasonic test location 104 of the component 66. For example, the probe 702 is positioned on the component 66 at a single point-of-contact between the contact surface 738 and the test location 104. To position the probe 702 on the test location 104 (e.g., in the deployed condition), an operator may push (e.g., translate) the inner tube 706 (see FIG. 7; e.g., the proximate end 762) in an axial direction toward the distal end 760 (see FIG. 7), relative to the longitudinal axis 728, thereby pushing portions of the probe housing 712 and the cable assembly 726 out of the enclosed tube portion 752 toward the distal end 748. As the angular bend 744 location of the SMA rods 720 translates out of the enclosed tube portion 752, the SMA rods 720 form the angular bend 744, thereby pivoting the probe 702 to position the contact surface 738 at (e.g., on, adjacent, or proximate) the test location 104 with the probe 702 positioned forming the predetermined angle α between the longitudinal axis 728 and the probe axis 730 (see FIG. 7). The SMA rods 720 and their remembered angular bend 744 aid precise positioning of the probe 702 (e.g., the contact surface 738) at the test location 104 to facilitate accurate and repeatable inspection of the component 66.

As shown in FIG. 9C, the wedge body 768 (e.g., the wedge surface 774) is positioned in contact with the cable assembly 726 at (e.g., on, adjacent, or proximate) the angular bend 744 to stabilize the position of the probe 702 relative to the test location 104. To position the wedge surface 774 in contact with the cable assembly 726, an operator may pull (e.g., translate) the rod 766 (see FIG. 7; e.g., the proximate end 772) in an axial direction toward the proximate end 772, relative to the longitudinal axis 728, thereby pulling the wedge surface 774 against the cable assembly 726.

With the probe 702 (e.g., the contact surface 738) positioned on the test location 104 of the component 66, the processing system 94 may control the signal generator 88 to generate and apply a driving voltage signal $V_D$ to the drive piezo 714B (see, e.g., FIG. 4), thereby inducing vibration (e.g., ultrasonic vibration) in the component 66. For example, the vibration of the drive piezo 714B may be transmitted into the component 66 through the preloaded contact between the tip member 716 (e.g., the contact surface 738) and the component 66. The processing system 94 may control the signal generator 88 to induce vibration of the drive piezo 714B along a range of frequencies to facilitate mapping of a vibratory response signature of the component 66. The vibratory response of the component 66 induces a sense voltage signal Vs of the sense piezo 714A (see, e.g., FIG. 4), which sense voltage signal Vs is indicative of the vibratory response of the component 66. The measurement channel 90 may convert the sense voltage signal Vs to a digital signal as resonance data to the processing system 94. The processing system 94, for example, may analyze the measured vibratory response using the resonance data to determine resonant frequencies and/or other structural mode parameters for the component 66. Where these resonant frequencies and/or other structural mode parameters) of the component 66 match (or are within a tolerance of) corresponding expected resonant frequencies and/or other structural mode parameters for a model component (e.g., a computer-modeled component, a previously inspected component, etc.) without any internal defects, the processing system 94 may determine the component 66 does not include, or there is a low probability that the component 66 includes, any internal defects. By contrast, where one or more of the resonant frequencies and/or other structural mode parameters do not match (or are outside tolerance of) the corresponding expected resonant frequencies and/or other structural mode parameters for the model component without any internal defects, the processing system 94 may determine the component 66 does include, or there is a high probability that the component 66 includes, one or more internal defects. In response to identification of a defect or a high probability of a defect, inspection personnel may take appropriate next steps to further inspect the component 66 and/or initiate a process for replacing the propulsion system 68, repairing the component 66, or replacing the component 66.

Figure 10:
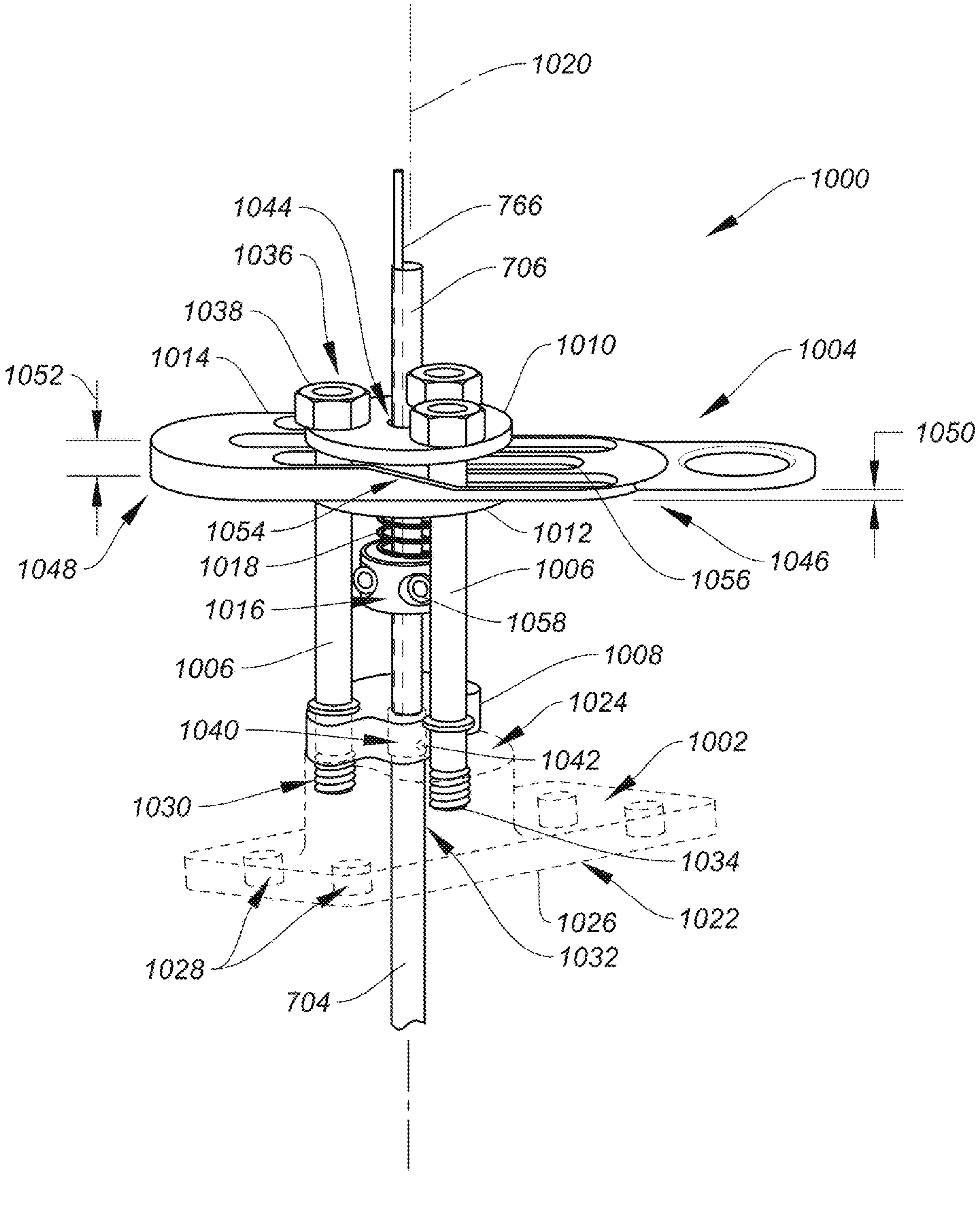
FIG. 10 illustrates a perspective view of a pre-load device for a probe assembly, in accordance with one or more embodiments of the present disclosure.

FIG. 10 illustrates a perspective view of a pre-load device 1000 for a probe assembly (e.g., a borescope probe assembly). For example, the pre-load device 1000 may be used with the probe assembly 700 (e.g., the pre-load device 710) of FIG. 7. However, while aspects of the pre-load device 1000 may be discussed herein with respect to the probe assembly 700, the pre-load device 1000 is not limited to use with the probe assembly 700 and, similarly, the probe assembly 700 is not limited to use with the pre-load device 1000. The pre-load device 1000 of FIG. 10 includes an adapter flange 1002 and a pre-load actuation assembly 1004. The pre-load actuation assembly 1004 includes one or more guideposts 1006, a guide tube collar 1008, a fixed plate 1010, an actuation plate 1012, a pull actuator 1014, an inner tube collar 1016, and a biasing member 1018.

The adapter flange 1002 extends (e.g., axially extends) along a longitudinal axis 1020 of the pre-load device 1000. The longitudinal axis 1020 may, for example, be the same as (e.g., coaxial with) the longitudinal axis 728. The adapter flange 1002 extends (e.g., axially extends) along the longitudinal axis 1020 between and to a first flange end 1022 of the adapter flange 1002 and a second flange end 1024 of the adapter flange 1002. The adapter flange 1002 forms a mating surface 1026 on the first flange end 1022. The mating surface 1026 is configured to be fixedly mounted on a structure of the propulsion system 68 (see FIG. 3; e.g., a portion of the engine static structure 36 (see FIG. 2)). The adapter flange 1002 forms one or more flange apertures 1028 along the mating surface 1026 to facilitate attachment of the adapter flange 1002 (e.g., by one or more mechanical fasteners) to the propulsion system 68 structure. The adapter flange 1002 further forms one or more guidepost apertures 1030 at (e.g., on, adjacent, or proximate) the second flange end 1024. The adapter flange 1002 forms a guide tube aperture 1032 extending through the adapter flange 1002 along the longitudinal axis 1020 from the first flange end 1022 to the second flange end 1024.

The guideposts 1006 (e.g., a bolt) are configured to be selectively mounted to the adapter flange 1002 (e.g., at the second flange end 1024) such that the guideposts 1006 extends parallel to or substantially parallel to the longitudinal axis 1020 between and to a first guidepost end 1034 of each of the guideposts 1006 and a second guidepost end 1036 of each of the guideposts 1006. For example, the guideposts 1006 (e.g., the first guidepost end 1034) may be fixedly mounted to the adapter flange 1002 by threaded engagement with the adapter flange 1002 (e.g., the guidepost apertures 1030). Each of the guideposts 1006 may include or be configured to receive a locking member 1038 (e.g., a bolt head, a threaded nut, etc.) on the second guidepost end 1036.

The guide tube collar 1008 is disposed on the guideposts 1006 at (e.g., on, adjacent, or proximate) the second guidepost end 1036. For example, with the pre-load actuation assembly 1004 installed on the adapter flange 1002, the guide tube collar 1008 may be disposed at (e.g., on, adjacent, or proximate) the second flange end 1024. The guide tube collar 1008 may be axially fixed on the guideposts 1006, for example, by one or more snap rings or other mechanical attachment features. The guide tube collar 1008 may include one or more keying features configured to facilitate installation (e.g., attachment) of the pre-load actuation assembly 1004 on the adapter flange 1002. The guide tube collar 1008 forms a guide tube aperture 1040 extending through the guide tube collar 1008 along the longitudinal axis 1020. The guide tube collar 1008 is configured for attachment to the outer guide tube 704 (e.g., the proximate end 750) with the outer guide tube 704 disposed within the guide tube aperture 1040. For example, the guide tube collar 1008 may be attached to the outer guide tube 704 by a spring pin 1042 (e.g., of the guide tube collar 1008 or the outer guide tube 704) selectively coupling the guide tube collar 1008 and the outer guide tube 704. Accordingly, the guide tube collar 1008 may be axially fixed or substantially axially fixed relative to the outer guide tube 704.

The fixed plate 1010 and the actuation plate 1012 are mounted on the guideposts 1006. The fixed plate 1010 is disposed at (e.g., on, adjacent, or proximate) the second guidepost end 1036. For example, the fixed plate 1010 may be disposed axially between (e.g., fixed between) the locking member 1038 and the pull actuator 1014. The actuation plate 1012 is axially translatable along the guideposts 1006. The actuation plate 1012 is disposed axially between the pull actuator 1014 and the biasing member 1018. The fixed plate 1010 and the actuation plate 1012 form a portion of a center aperture 1044 of the pre-load actuation assembly 1004, along the longitudinal axis 1020, through which the inner tube 706 and the wedge member 708 (e.g., the rod 766) extend.

The pull actuator 1014 extends (e.g., radially extends) between and to a first radial end 1046 of the pull actuator 1014 and a second radial end 1048 of the pull actuator 1014. The pull actuator 1014 has a first thickness 1050 (e.g., an axial thickness) at (e.g., on, adjacent, or proximate) the first radial end 1046. The pull actuator 1014 has a second thickness 1052 (e.g., an axial thickness) at (e.g., on, adjacent, or proximate) the second radial end 1048. The second thickness 1052 is greater than the first thickness 1050. The pull actuator 1014 includes a transition portion 1054 within which the pull actuator 1014 expands from the first thickness 1050 to the second thickness 1052 in the radial direction. The pull actuator 1014 forms a slot 1056 extending longitudinally in the radial direction between the first radial end 1046 and the second radial end 1048. The slot 1056 forms a portion of the center aperture 1044. The pull actuator 1014 is mounted on the guideposts 1006. The pull actuator 1014 may form additional slots through which the guideposts 1006 may extend. The pull actuator 1014 is radially translatable on the guideposts 1006 between a relaxed position and an actuated position. In the relaxed position, the first thickness 1050 is positioned axially between and contacting the fixed plate 1010 and the actuation plate 1012 (e.g., an axial distance between the fixed plate 1010 and the actuation plate 1012 is the first thickness 1050). In the actuated position, the second thickness 1052 is positioned axially between and contacting the fixed plate 1010 and the actuation plate 1012 (e.g., an axial distance between the fixed plate 1010 and the actuation plate 1012 is the second thickness 1052).

The inner tube collar 1016 forms another portion of the center aperture 1044. The inner tube collar 1016 is configured to be fixedly attached to the inner tube 706 with the inner tube 706 extending through the center aperture 1044. For example, the inner tube collar 1016 may include one or more fasteners 1058 configured to positionally fix the inner tube collar 1016 on the inner tube 706. The inner tube collar 1016 may be mounted to or otherwise disposed on the biasing member 1018. For example, the inner tube collar 1016 may be positioned with the biasing member 1018 disposed (e.g., compressed) axially between the inner tube collar 1016 and the actuation plate 1012. The biasing member 1018 may be configured, for example, as a spring extending circumferentially about (e.g., completely around) the longitudinal axis 1020 to further form the center aperture 1044.

In operation of the pre-load device 1000 by an operator, the adapter flange 1002 (e.g., the mating surface 1026) may be installed on a structure of the propulsion system 68 (see FIG. 3; e.g., a portion of the engine static structure 36 (see FIG. 2)). For example, the adapter flange 1002 may be fixedly mounted to the propulsion system 68 structure by one or more mechanical fasteners through the flange apertures 1028. The pre-load actuation assembly 1004 assembled with components of the probe assembly 700 (e.g., the probe 702, the outer guide tube 704, the inner tube 706, and the tube member 708). In particular, the probe 702, the outer guide tube 704, the inner guide tube 706, and the tube member 708 may be inserted into the propulsion system 68 through the guide tube aperture 1032 until the guideposts 1006 contact the adapter flange 1002. The guideposts 1006 (e.g., the first guidepost end 1034) may be engaged (e.g., threadably engaged) with the adapter flange 1002, for example, within the guidepost apertures 1030. The inner tube 706 may be inserted through the pre-load device 1000 (e.g., the center aperture 1044) and into the propulsion system 68. For example, inner tube 706 may be inserted through the pre-load device 1000 until the probe 702 contacts or is otherwise disposed proximate the component 66 (see FIGS. 3 and 9A-C). The operator may engage the inner tube collar 1016 with the inner tube 706 by tightening the fasteners 1058. The operator may then translate (e.g., pull) the pull actuator 1014 in the radial direction from the relaxed position to the actuated position, thereby compressing the biasing member 1018 between the actuation plate 1012 and the inner tube collar 1016 and applying a fixed, pre-load biasing force to the probe 702 against the component 66.

Figure 11:
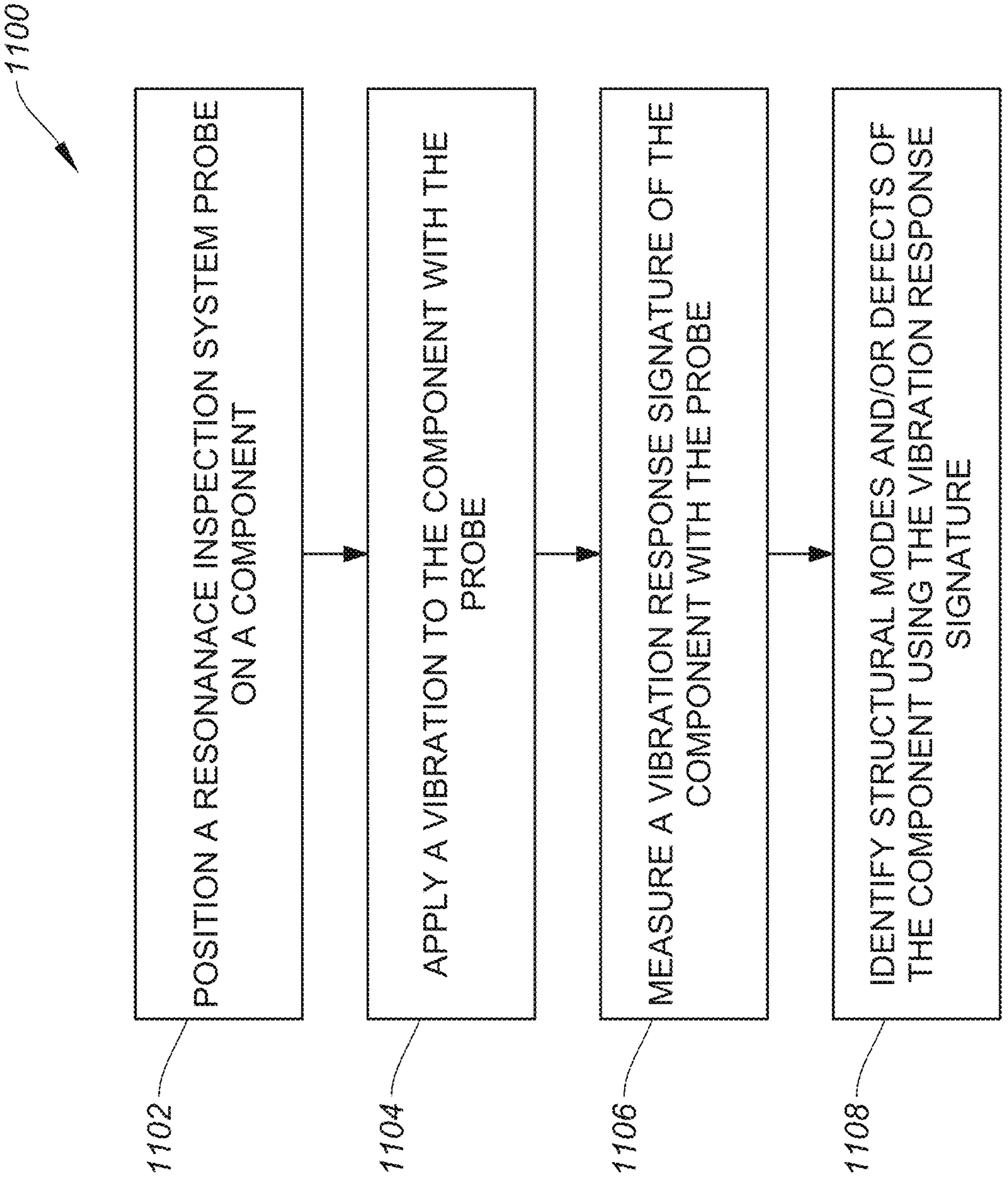
FIG. 11 illustrates a block diagram depicting a method for structural mode and defect identification using resonance inspection data, in accordance with one or more embodiments of the present disclosure.

Referring to FIG. 11, a method 1100 for identifying structural modes and/or defects of a component (e.g., an aircraft propulsion system component; the component 66 (see FIGS. 3 and 9A-C)) using resonance inspection data is provided. FIG. 11 illustrates a flowchart for the method 1100. Aspects of the method 1100 are described herein for the component 66 and the inspection system 64. The control assembly 72 and its processing system 94 may be used to execute or control one or more steps of the method 1100. For example, the processor 96 may execute instructions stored in the memory 98, thereby causing the processing system 94 and/or its processor 96 to execute or otherwise control one or more steps of the method 1100. However, the method 1100 is not limited to use with the particular inspection system 64, probe assemblies, component 66, or the aircraft propulsion system 22, 68 of the present disclosure. Unless otherwise noted herein, it should be understood that the steps of method 1100 are not required to be performed in the specific sequence in which they are discussed below and, in some embodiments, the steps of the method 1100 may be performed separately or simultaneously.

Step 1102 includes positioning the probe 74, 702 on the component 66. For example, an operator may operate the probe assembly 70, 700 to insert the probe 74, 702 into the propulsion system 68 to position the probe 74, 702 on the component 66, as previously discussed. The probe 74, 702 may be positioned on the component 66 with the component 66 installed in the propulsion system 68 and with the propulsion system 68 installed on or removed from an associated aircraft (e.g., the aircraft 20; see FIG. 1). Alternatively, the probe 74, 702 may be positioned on the component 66 with the component 66 removed from the propulsion system 68.

Step 1104 includes applying a vibration (e.g., an ultrasonic vibration) to the component 66 with the probe 74, 702. For example, the processing system 94 may control the signal generator 88 to induce vibration of the drive piezo 80B, 714B along a range of frequencies to facilitate mapping of a vibratory response signature of the component 66.

Step 1106 includes measuring the vibratory response signature of the component 66 while applying the vibration to the component 66 (see step 1104). As previously discussed, the vibratory response of the component 66 includes a sense voltage signal Vs of the sense piezo 80A, 714A (see, e.g., FIG. 4), which sense voltage signal Vs is indicative of the vibratory response of the component 66. The measurement channel 90 may convert the sense voltage signal Vs to a digital signal as resonance data to the processing system 94. The resonance data may include the vibratory response signature of the component 66 over the range of frequencies applied to the component 66 by the drive piezo 80B, 714B. The processing system 94 may process the resonance data (e.g., the vibratory response signature of the component 66) over all or a portion of the frequency range of the vibratory response signature to generate or otherwise identify a plurality of different resonance spectra waveforms of the vibratory response signature. The resonance spectra waveforms may identify parts of the vibratory response signature including a magnitude (decibels (dB)) spectra part, a phase (degrees) spectra part, a real spectra part, and/or an imaginary (complex) spectra part.

Step 1108 includes identifying structural modes of the component 66 using the resonance spectra waveforms of the resonance data (e.g., the vibratory response signature of the component 66). Referring to FIGS. 11A-C, step 1108 includes identifying structural modes of the component 66 using a first resonance spectra waveform 1120 and a second resonance spectra waveform 1122. The first resonance spectra waveform 1120 is different than the second resonance spectra waveform 1122. The first resonance spectra waveform 1120 is one of a magnitude spectra part or a real spectra part of the vibratory response signature for a given frequency range of the vibratory response signature. The second resonance spectra waveform 1122 is one of a phase spectra part or an imaginary spectra part of the vibratory response signature for the given frequency range of the vibratory response signature. Where the first resonance spectra waveform 1120 is the magnitude spectra part, the second resonance spectra waveform 1122 is the phase spectra part. Similarly, where the first resonance spectra waveform 1120 is the real spectra part, the second resonance spectra waveform 1122 is the imaginary spectra part. Analysis of the first resonance spectra waveform 1120 and the second resonance spectra waveform 1122, in accordance with the present disclosure, facilitates increased confidence in structural mode identification (e.g., differentiation from background noise) in comparison to at least some conventional structural mode identification processes.

Step 1108 may include identifying one or more structural modes of the component 66 using the first resonance spectra waveform 1120 and the second resonance spectra waveform 1122. The first resonance spectra waveform 1120 and the second resonance spectra waveform 1122 may be representative of waveforms generated and measured using an ultrasonic testing probe having a double-stack piezo configuration (e.g., the probe 74 and/or the probe 702). However, aspects of the present disclosure method 1100 may be similarly applicable to single-stack piezo configurations. Referring to FIG. 12A, the processing system 94 may analyze the first resonance spectra waveform 1120 and the second resonance spectra waveform 1122 for all or a subset (e.g., one or more 20 KHz frequency increments) of the frequency range of the vibratory response signature. The first resonance spectra waveform 1120 may include one or more "Z" waveform shapes characterized by a dip and an immediately-following peak. The processing system 94 identifies a maximum slope point 1126 of the first resonance spectra waveform 1120 within the analyzed frequency range for the Z waveform shape. The first resonance spectra waveform 1120 of FIG. 12A is illustrated with a single maximum slope point 1126, however, the first resonance spectra waveform 1120 may, of course, include a plurality of maximum slope points 1126 within the analyzed frequency range. The processing system 94 identifies each peak 1124 of the second resonance spectra waveform 1122 within an analyzed frequency range. The second resonance spectra waveform 1122 of FIG. 12A is illustrated with a single peak 1124, however, the second resonance spectra waveform 1122 may, of course, include a plurality of peaks 1124 within the analyzed frequency range. The processing system 94 may identify a structural mode of the component 66 where one of the peaks 1124 and one of the maximum slope points 1126 correspond to a same or substantially same frequency. For example, the processing system 94 may identify a structural mode of the component 66 where one of the peaks 1124 and one of the maximum slope points 1126 are identified by the processing system 94 within a predetermined frequency range threshold 1128. Routine experimentation and/or analysis may be performed by one of ordinary skill in the art to select a predetermined frequency range threshold suitable for identifying a structural mode of a given component, in accordance with and as informed by one or more aspects of the present disclosure.

Figure 12B:
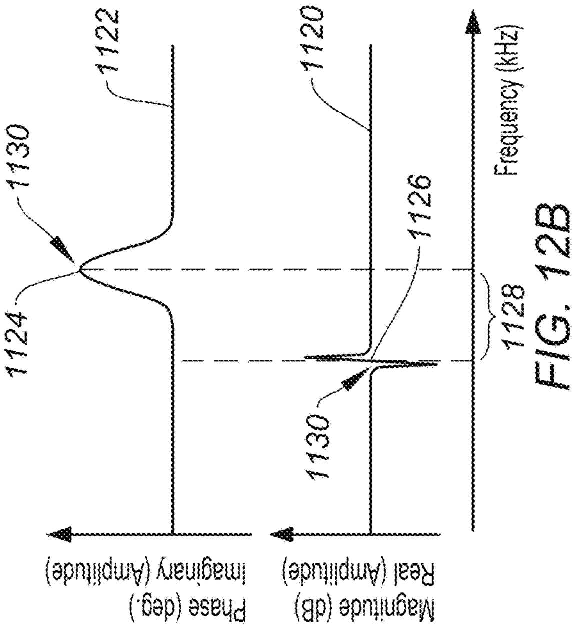
FIGS. 12A-C illustrate various exemplary resonance inspection data waveform relationships, in accordance with one or more embodiments of the present disclosure.
Figure 12C:
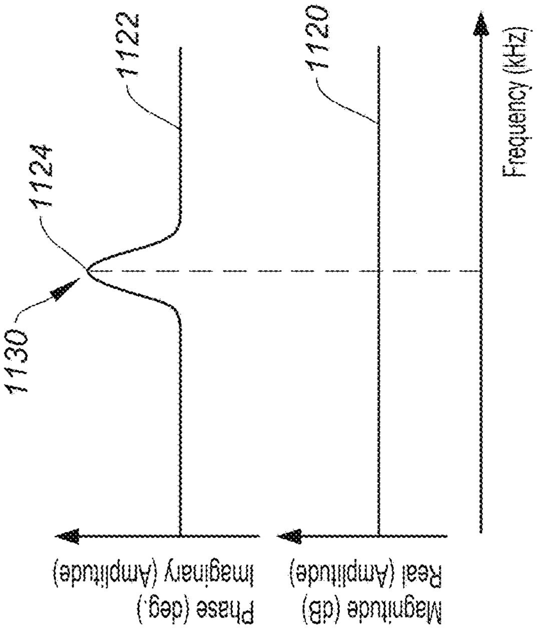
Figure 12A:
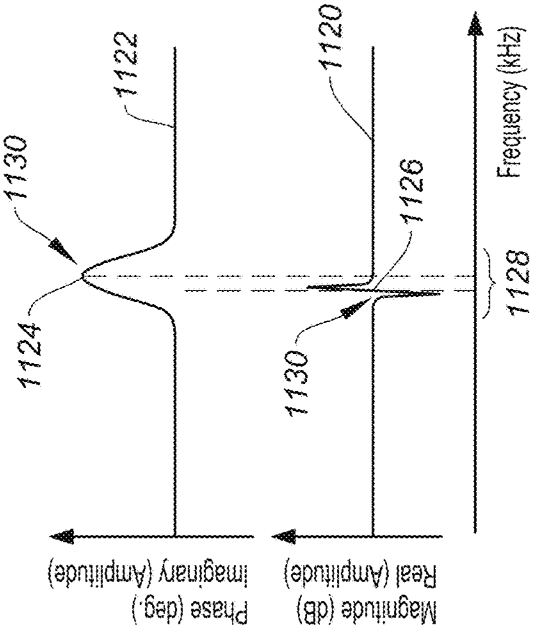

FIGS. 12B and 12C illustrate exemplary portions of the first resonance spectra waveform 1120 and the second resonance spectra waveform 1122 which may correspond to a frequency range which does not include a structural mode for the component 66. As described above, the processing system 94 may analyze the first resonance spectra waveform 1120 and the second resonance spectra waveform 1122 and identify each maximum slope point 1126 and each peak 1124. The processing system 94 may identify an absence of a structural mode of the component 66 at a given frequency or frequency range (or alternatively the processing system 94 may not identify a presence of a structural mode of the component 66 at the given frequency or frequency range). Referring to FIG. 12B, for example, the processing system 94 may identify the absence of a structural mode (or may not identify the presence of a structural mode) of the component 66 where the peak 1124 and an adjacent (i.e., on the frequency range) maximum slope point 1126 have a frequency difference which is greater than the predetermined frequency range threshold 1128.

Additionally or alternatively, the processing system 94 may identify an absence of a structural mode of the component 66 at a given frequency or frequency range (or alternatively the processing system 94 may not identify a presence of a structural mode of the component 66 at the given frequency or frequency range) where the processing system 94 identifies the absence of a feature 1130 of the first resonance spectra waveform 1120 and/or the second resonance spectra waveform 1122 at a given frequency or frequency range. The feature 1130 (e.g., for the first resonance spectra waveform 1120) may be a maximum slope point (e.g., the maximum slope point 1126) having a slope greater than or equal to a predetermined slope threshold. Similarly, the feature 1130 (e.g., for the second resonance spectra waveform 1122) may be a peak (e.g., the peak 1124) having a magnitude or amplitude greater than or equal to a predetermined peak threshold. As shown in FIG. 12C, for example, the second resonance spectra waveform 1122 includes an instance of the feature 1130 (e.g., the peak 1124), however, the first resonance spectra waveform 1120 does not include a corresponding instance of the feature 1130 (e.g., the maximum slope point 1126). Accordingly, the processing system 94 may identify the absence of a structural mode (or may not identify the presence of a structural mode) of the component 66) at or near the frequency of the peak 1124.

Identification of the presence or absence of structural modes of the component 66, as described for step 1108, may facilitate identifying (e.g., with the processing system 94 or another system) the component 66 includes at least one defect or has a high probability of including at least one defect (collectively a "defect condition") such as, but not limited to, an internal defect, using the first resonance spectra waveform 1120 and the second resonance spectra waveform 1122. A frequency or frequency range of an expected structural mode of the component 66 may be known from another instance of the component 66 such as, but not limited to, a model component (e.g., a computer-modeled component, a previously inspected component, etc.) without any internal defects.

Resonance-based inspection methods may facilitate rapid inspection of components (e.g., aircraft propulsion system components) in situ, however, identifying component-level structural modes and/or defects is challenging. For example, conventional resonance-based inspections of a component installed in an aircraft propulsion system may yield resonance inspection data for the component which reflects the structural modes and damping effects of adjacent components of the aircraft propulsion system, thereby complicating identification of structural modes and/or defects of the component under inspection. The present disclosure method 1100 facilitates greater accuracy for identification of the presence or absence of structural modes and defects of components and mitigates the influence of adjacent structure response when analyzing resonance inspection data for the component under inspection. Moreover, for single point-of-contact resonance inspection probes (e.g., the probe 702), analysis of a part of the vibratory response signature of a component (e.g., a magnitude part of the vibratory response signature) may be insufficient for accurately identifying structural modes of the component.

While the principles of the disclosure have been described above in connection with specific apparatuses and methods, it is to be clearly understood that this description is made only by way of example and not as limitation on the scope of the disclosure. Specific details are given in the above description to provide a thorough understanding of the embodiments. However, it is understood that the embodiments may be practiced without these specific details.

It is noted that the embodiments may be described as a process which is depicted as a flowchart, a flow diagram, a block diagram, etc. Although any one of these structures may describe the operations as a sequential process, many of the operations can be performed in parallel or concurrently. In addition, the order of the operations may be rearranged. A process may correspond to a method, a function, a procedure, a subroutine, a subprogram, etc.

The singular forms "a," "an," and "the" refer to one or more than one, unless the context clearly dictates otherwise. For example, the term "comprising a specimen" includes single or plural specimens and is considered equivalent to the phrase "comprising at least one specimen." The term "or" refers to a single element of stated alternative elements or a combination of two or more elements unless the context clearly indicates otherwise. As used herein, "comprises" means "includes." Thus, "comprising A or B," means "including A or B, or A and B," without excluding additional elements.

It is noted that various connections are set forth between elements in the present description and drawings (the contents of which are included in this disclosure by way of reference). It is noted that these connections are general and, unless specified otherwise, may be direct or indirect and that this specification is not intended to be limiting in this respect. Any reference to attached, fixed, connected, or the like may include permanent, removable, temporary, partial, full and/or any other possible attachment option.

The terms "substantially," "about," "approximately," and other similar terms of approximation used throughout this patent application are intended to encompass variations or ranges that are reasonable and customary in the relevant field. These terms should be construed as allowing for variations that do not alter the basic essence or functionality of the invention. Such variations may include, but are not limited to, variations due to manufacturing tolerances, materials used, or inherent characteristics of the elements described in the claims, and should be understood as falling within the scope of the claims unless explicitly stated otherwise.

No element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprise", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various inventive aspects, concepts and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts, and features of the disclosures—such as alternative materials, structures, configurations, methods, devices, and components, and so on—may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the present application even if such embodiments are not expressly disclosed herein. For example, in the exemplary embodiments described above within the Detailed Description portion of the present specification, elements may be described as individual units and shown as independent of one another to facilitate the description. In alternative embodiments, such elements may be configured as combined elements.

The invention claimed is:

1. A probe assembly for a resonance inspection system, the probe assembly comprising:

an outer guide tube extending along a longitudinal axis between and to a distal outer tube end and a proximate outer tube end; and a probe at least partially disposed within the outer guide tube, the probe is axially translatable relative to the outer guide tube along the longitudinal axis, the probe includes a probe housing, at least one piezoelectric transducer, a flexible cable assembly, and at least one shape-memory alloy (SMA) rod, the probe housing extends along a probe axis of the probe between and to a distal housing end and a proximate housing end, the at least one piezoelectric transducer is disposed within the probe housing at the distal end, the flexible cable assembly is connected to the probe housing at the proximate housing end, the at least one SMA rod is disposed at the proximate housing end and positioned within the probe housing and the flexible cable assembly, the at least one SMA rod is configured with a remembered angular bend disposed within the flexible cable assembly;

the probe is selectively positionable in a retracted condition and a deployed condition relative to the outer guide tube:

in the retracted condition, the probe has a first axial probe position relative to the longitudinal axis, the probe axis is aligned with the longitudinal axis, and the remembered angular bend is constrained within the outer guide tube, and in the deployed condition, the probe has a second axial probe position relative to the longitudinal axis and the probe axis is oriented at a predetermined angle relative to the longitudinal axis by the remembered angular bend.

2. The probe assembly of claim 1, wherein the at least one piezoelectric transducer includes a sense piezo and a drive piezo.

3. The probe assembly of claim 2, wherein the sense piezo and the drive piezo form a double-stacked piezo configuration of the at least one piezoelectric transducer with the sense piezo and the drive piezo disposed on the probe axis.

4. The probe assembly of claim 3, wherein the sense piezo is disposed at the distal housing end and the drive piezo is disposed axially between the sense piezo and the proximate housing end relative to the probe axis.

5. The probe assembly of claim 3, wherein the probe further includes a tip member disposed at the distal housing end and outside of the probe housing, the tip member includes a tip member material, and the tip member material is alumina.

6. The probe assembly of claim 5, wherein the tip member includes a contact surface, and the contact surface has a spherical dome shape centered about the probe axis.

7. The probe assembly of claim 5, wherein the probe further includes a separator member disposed axially, relative to the probe axis, between and contacting the sense piezo and the drive piezo, the separator member includes a separator member material, and the separator member material is alumina.

8. The probe assembly of claim 1, wherein the probe further includes a tail mass and a vibration isolator, the tail mass is disposed at and contacting the at least one piezoelectric transducer, the vibration isolator is disposed axially, relative to the probe axis, between and contacting the tail mass and the at least one SMA rod.

9. The probe assembly of claim 1, further comprising an inner tube disposed within the outer guide tube, the inner tube is axially translatable along the longitudinal axis within the outer guide tube, the inner tube extends along the longitudinal axis between and to a distal inner tube end and a proximate inner tube end, the inner tube surrounds a portion of the flexible cable assembly, and the inner tube is fixedly attached to the flexible cable assembly at the distal inner tube end.

10. The probe assembly of claim 9, further comprising a pre-load device coupled to the inner tube, the pre-load device configured to selectively axially bias the inner tube, relative to the longitudinal axis, in an axial direction toward the distal inner tube end.

11. The probe assembly of claim 9, further comprising a wedge member, the wedge member includes a rod and a wedge body, the rod is disposed within the outer guide tube and radially between the outer guide tube and the inner tube relative to the longitudinal axis, the rod is axially translatable along the longitudinal axis within the outer guide tube, the rod extends along the longitudinal axis between and to a distal rod end and a proximate rod end, the wedge body is disposed at the distal rod end, the wedge body is axially translatable with the rod between and to a first axial wedge position and a second axial wedge position, in the first axial wedge position the wedge body is axially separated from the probe and in the second axial wedge position the wedge body contacts the probe.

12. The probe assembly of claim 1, wherein the outer guide tube includes an enclosed tube portion and an open tube portion, the enclosed tube portion extends between and to the proximate outer tube end and the open tube portion, the open tube portion extends between and to the enclosed tube portion and the distal outer tube end, and the probe housing is disposed at the open tube portion in the retracted condition of the probe.

13. The probe assembly of claim 12, wherein the outer guide tube further includes a wear strip disposed at an interface between the enclosed tube portion and the open tube portion.

14. A method for positioning a probe assembly for a resonance inspection system on an interior component of an aircraft propulsion system, the method comprising:

inserting the probe assembly into the aircraft propulsion system to position a probe of the probe assembly at the interior component with the probe in a retracted condition of the probe, the probe including a probe housing, at least one piezoelectric transducer, and at least one shape-memory alloy (SMA) rod, the probe housing extends along a probe axis of the probe between and to a distal housing end and a proximate housing end, the at least one piezoelectric transducer is disposed within the probe housing at the distal end, the at least one SMA rod is configured with a remembered angular bend, the probe assembly further including an outer guide tube extending along a longitudinal axis between and to a distal outer tube end and a proximate outer tube end, and, in the retracted condition of the probe, the probe axis is aligned with the longitudinal axis and at least a portion of the probe is disposed within the outer guide tube with the outer guide tube constraining the remembered angular bend; and positioning the probe on the interior component by positioning the probe from the retracted condition to a deployed condition of the probe by axially translating the probe, relative to the longitudinal axis, from a first axial probe position to a second axial probe position, and in the second axial probe position:

the probe axis is oriented at a predetermined angle relative to the longitudinal axis by the remembered angular bend, and the probe is positioned on the interior component.

15. The method of claim 14, further comprising axially translating a wedge member of the probe assembly, relative to the longitudinal axis, to contact the probe with the probe in the deployed condition.

16. The method of claim 14, wherein the steps of inserting the probe assembly into the aircraft propulsion system and positioning the probe on the interior component are performed with the aircraft propulsion system installed on an aircraft.

17. The method of claim 14, wherein the interior component is a gas turbine engine rotor disk of the aircraft propulsion system.

18. A probe assembly for a resonance inspection system, the probe assembly comprising:

an outer guide tube extending along a longitudinal axis between and to a distal outer tube end and a proximate outer tube end;

an inner tube disposed within the outer guide tube, the inner tube is axially translatable along the longitudinal axis within the outer guide tube, the inner tube extends along the longitudinal axis between and to a distal inner tube end and a proximate inner tube end; and a probe at least partially disposed within the outer guide tube, the probe is axially translatable relative to the outer guide tube along the longitudinal axis, the probe includes a probe housing, at least one piezoelectric transducer, a flexible cable assembly, and at least one shape-memory alloy (SMA) rod, the probe housing extends along a probe axis of the probe between and to a distal housing end and a proximate housing end, the at least one piezoelectric transducer is disposed within the probe housing at the distal end, the flexible cable assembly is connected to the probe housing at the proximate housing end, the flexible cable assembly extends through the inner tube, the flexible cable assembly is fixedly attached to the inner tube at the distal inner tube end, the at least one SMA rod is disposed at the proximate housing end and positioned within the probe housing and the flexible cable assembly, the at least one SMA rod is configured with a remembered angular bend, and the remembered angular bend is disposed within the flexible cable assembly between the proximate housing end and the distal inner tube end.

19. The probe assembly of claim 18, wherein the at least one piezoelectric transducer includes a sense piezo and a drive piezo.

20. The probe assembly of claim 19, wherein the sense piezo and the drive piezo form a double-stacked piezo configuration of the at least one piezoelectric transducer with the sense piezo and the drive piezo disposed on the probe axis.

* * * * *